US010902045B2

(12) United States Patent
Ericson et al.

(10) Patent No.: US 10,902,045 B2
(45) Date of Patent: Jan. 26, 2021

(54) NATURAL LANGUAGE INTERFACE FOR BUILDING DATA VISUALIZATIONS, INCLUDING CASCADING EDITS TO FILTER EXPRESSIONS

(71) Applicant: Tableau Software, Inc., Seattle, WA (US)

(72) Inventors: Jeffrey Ericson, Menlo Park, CA (US); Sanaz Golbabaei, Palo Alto, CA (US); Theodore Kornish, Palo Alto, CA (US); Vidya Setlur, Portola Valley, CA (US); Alex Djalali, Los Gatos, CA (US)

(73) Assignee: Tableau Software, Inc., Seattle, WA (US)

( * ) Notice: Subject to any disclaimer, the term of this patent is extended or adjusted under 35 U.S.C. 154(b) by 79 days.

(21) Appl. No.: 16/134,907

(22) Filed: Sep. 18, 2018

(65) Prior Publication Data

US 2020/0089700 A1 Mar. 19, 2020

(51) Int. Cl.
*G06F 16/35* (2019.01)
*G06F 16/335* (2019.01)
(Continued)

(52) U.S. Cl.
CPC ............ *G06F 16/358* (2019.01); *G06F 3/048* (2013.01); *G06F 16/335* (2019.01);
(Continued)

(58) Field of Classification Search
CPC ...... G06F 40/40; G06F 40/166; G06F 16/335; G06F 16/904; G06F 3/0482; G06F 3/048;
(Continued)

(56) References Cited

U.S. PATENT DOCUMENTS 8,321,465 B2 * 11/2012 Farber ................... G06Q 40/00
707/802
9,244,971 B1 * 1/2016 Kalki ................ G06F 16/24542
(Continued)

FOREIGN PATENT DOCUMENTS

WO WO2018/204696 A1 11/2018

OTHER PUBLICATIONS

Hoque, Enamul et al., "Applying Pragmatics Principles for Interaction with Visual Analytics," IEEE Transaction of Visualization and Computer Graphics, IEEE Service Center, Los Alamitos, CA, vol. 24, No. 1, Jan. 1, 2018, 10 pgs.
(Continued)

*Primary Examiner* — Edwin S Leland, III
(74) *Attorney, Agent, or Firm* — Morgan, Lewis & Bockius LLP

(57) ABSTRACT

A method is performed at a computing device having a display, one or more processors, and memory. The device displays a graphical user interface on the display. A user provides a natural language input, which specifies a filter, including a first data field, a relation, and a first comparison value. The user then replaces the first data field in the filter with a second data field. In response to replacing the first data field, the device automatically replaces the first comparison value with a second comparison value. The second comparison value corresponds to the data type of the second data field. In some instances, the device also updates the relation based on the data type of the second data field. The device then displays an updated data visualization according to the updated filter.

18 Claims, 25 Drawing Sheets

(51) Int. Cl.
*G06F 17/28* (2006.01)
*G06F 16/904* (2019.01)
*G06F 17/24* (2006.01)
*G06F 40/40* (2020.01)
*G06F 40/166* (2020.01)
*G06F 40/205* (2020.01)
*G06F 40/30* (2020.01)
*G06F 3/048* (2013.01)
*G06F 3/0482* (2013.01)

(52) U.S. Cl.
CPC .......... *G06F 16/904* (2019.01); *G06F 40/166* (2020.01); *G06F 40/205* (2020.01); *G06F 40/30* (2020.01); *G06F 40/40* (2020.01); *G06F 3/0482* (2013.01)

(58) Field of Classification Search
CPC ...... G06F 40/30; G06F 40/205; G06F 40/289; G06F 3/04812; G06F 16/44
USPC .................................................... 704/4; 707/7
See application file for complete search history.

(56) References Cited

U.S. PATENT DOCUMENTS

| | | | | |
|---|---|---|---|---|
| 2004/0073565 A1* | 4/2004 | Kaufman | ............ | G06F 16/252 |
| 2004/0114258 A1* | 6/2004 | Harris, III | ............ | G06F 40/166 359/841 |
| 2005/0015364 A1* | 1/2005 | Payton | ............ | G06F 16/2423 |
| 2007/0179939 A1* | 8/2007 | O'Neil | ............ | G06F 16/252 |
| 2008/0046462 A1* | 2/2008 | Kaufman | ............ | G06F 16/2423 |
| 2011/0191303 A1* | 8/2011 | Kaufman | ............ | G06F 16/21 707/684 |
| 2014/0189548 A1* | 7/2014 | Werner | ............ | G06F 8/33 715/762 |
| 2015/0019216 A1* | 1/2015 | Singh | ............ | G06F 16/24578 704/235 |
| 2015/0026153 A1* | 1/2015 | Gupta | ............ | G06N 5/04 707/711 |
| 2015/0026609 A1* | 1/2015 | Kim | ............ | G06F 16/25 715/762 |
| 2015/0095365 A1* | 4/2015 | Olenick | ............ | G06F 16/2428 707/766 |
| 2016/0103886 A1* | 4/2016 | Prophete | ............ | G06F 16/248 707/722 |
| 2016/0335180 A1* | 11/2016 | Teodorescu | ............ | G06F 3/067 |
| 2017/0083615 A1* | 3/2017 | Boguraev | ............ | G06F 16/3344 |
| 2018/0181608 A1* | 6/2018 | Wu | ............ | G06F 16/2423 |
| 2019/0205442 A1* | 7/2019 | Vasudev | ............ | G06F 16/2379 |
| 2020/0065769 A1* | 2/2020 | Gupta | ............ | G06Q 10/1053 |
| 2020/0089700 A1* | 3/2020 | Ericson | ............ | G06F 16/904 |
| 2020/0089760 A1* | 3/2020 | Ericson | ............ | G06F 3/0482 |

OTHER PUBLICATIONS

Tableau Software Inc., International Search Report and Written Opinion, PCT/US2019/047892, dated Mar. 4, 2020, 24 pgs.
Ericson, Office Action, U.S. Appl. No. 16/134,892, dated May 15, 2020, 10 pgs.

* cited by examiner

614 In response to receiving the second input, updating the second phrase based on the second input.

616 Perform a lookup in a database to determine that the second phrase is dependent on the first term of the first phrase. Updating the second phrase is performed in accordance with a determination that the second phrase is dependent on the first term of the first phrase.

618 The second phrase comprises a sub-portion of the first phrase. Updating the second phrase based on the second input comprises updating the sub-portion of the first phrase.

620 The first phrase and the second phrase are distinct phrases.

622 Updating the second phrase comprises removing a third term from the second phrase and adding the second term to the second phrase to replace the third term.

624 Updating the second phrase comprises removing the second phrase.

626 In response to updating the second phrase based on the second input:

628 Display, on the graphical user interface, an updated natural language expression that comprises the modified first phrase and the updated second phrase.

630 Display the updated data visualization representing the updated natural language expression.

NATURAL LANGUAGE INTERFACE FOR BUILDING DATA VISUALIZATIONS, INCLUDING CASCADING EDITS TO FILTER EXPRESSIONS

CROSS REFERENCE TO RELATED APPLICATION

This application is related to U.S. patent application Ser. No. 16/134,892, filed Sep. 18, 2018, entitled "Analyzing Natural Language Expressions in a Data Visualization User Interface," which is incorporated herein by reference in its entirety.

TECHNICAL FIELD

The disclosed implementations relate generally to data visualization and more specifically to systems, methods, and user interfaces that enable users to interact with data visualizations using natural language expressions.

BACKGROUND

Data visualization applications enable a user to understand a data set visually, including distribution, trends, outliers, and other factors that are important to making business decisions. Some data sets are very large or complex, and include many data fields. Various tools can be used to help a user generate data visualizations for various data sets, but typically require a user to learn a complex user interface.

SUMMARY

The use of natural language expressions to generate data visualizations provides a user with greater accessibility to data visualization features, including updating the fields and changing how the data is filtered. A natural language interface enables a user to develop valuable data visualizations with little or no training.

Accordingly, the present disclosure provides more efficient methods and interfaces for manipulating and generating graphical views of data using natural language inputs. Such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

Some implementations provide for automatically updating related phrases within a natural language expression used to generate a data visualization. For example, when a user changes one phrase in the natural language expression, another phrase of the natural language expression may also need to be updated to avoid raising an error. In some implementations, updating the phrases of the natural language expression results in changing a data visualization representing the data identified by the natural language expression.

In accordance with some implementations, a method executes at a computing device coupled with a display. For example, the computing device can be a smart phone, a tablet, a notebook computer, or a desktop computer. The method includes displaying a graphical user interface on the display. The method includes analyzing a natural language input, received from a user, to identify a portion of the natural language input corresponding to a first phrase that includes a first term. The method also identifies a second portion corresponding to a second phrase. The method further includes receiving, from the user, a second input, which modifies the first term in the first phrase. In response to receiving the second input, the computing device updates the second phrase based on the second input. In response to updating the second phrase based on the second input, the computing device displays, on the graphical user interface, an updated natural language expression that comprises the modified first phrase and the updated second phrase, and displays an updated data visualization representing the updated natural language expression.

In some implementations, the natural language input is received in a user interface control in the graphical user interface.

In some instances, the natural language input includes two or more distinct phrases.

In some instances, the second input that modifies the first term in the first phrase includes a second term that replaces the first term in the first phrase.

In some instances, the second input that modifies the first term in the first phrase removes the first term in the first phrase.

In some instances, the method further comprises, before receiving the second input, displaying an initial data visualization, distinct from the updated data visualization, according to the first and second phrases.

In some implementations, the method further performs a lookup in a database to determine that the second phrase is dependent on the first term of the first phrase. Updating the second phrase is performed in accordance with a determination that the second phrase is dependent on the first term of the first phrase.

In some instances, the second phrase is a sub-portion of the first phrase, and updating the second phrase based on the second input updates the sub-portion of the first phrase.

In some instances, the first phrase and the second phrase are distinct phrases.

In some instances, updating the second phrase based on the second term removes a third term from the second phrase and adds the second term to the second phrase to replace the third term.

In some instances, updating the second phrase based on the second term removes the second phrase.

In accordance with some implementations, a method executes at a computer with a display. For example, the computer can be a smart phone, a tablet, a notebook computer, or a desktop computer. The method includes displaying a graphical user interface on the display. The method includes receiving, from a user, a natural language input that specifies a filter condition, including a first data field, a relation, and a comparison value.

The method further includes receiving input to switch from the first data field to the second data field. The method includes, in response to the user input, automatically selecting a second comparison value according to the data type of the second data field and displaying, in the graphical user interface, an updated data visualization corresponding to the updated filter.

In some instances, the domain of the first data field includes the first comparison value.

In some instances, the data type of the first data field is different from the data type of the second data field.

In some implementations, the method further comprises, before receiving the user update, displaying, on the graphical user interface, an initial data visualization, distinct from the updated data visualization, according to the filter condition.

In some implementations, the method further comprises identifying a default value for the second comparison value.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily build and update data visualizations using natural language commands.

BRIEF DESCRIPTION OF THE DRAWINGS

For a better understanding of the disclosed systems, methods, and graphical user interfaces, as well as additional systems, methods, and graphical user interfaces that provide natural language interfaces, reference should be made to the Description of Implementations below, in conjunction with the following drawings, in which like reference numerals refer to corresponding parts throughout the figures.

FIGS. 6A and 6B provide a flowchart of a process for displaying an updated data visualization according to some implementations.

FIGS. 8A-8J illustrate widgets used in a natural language interface according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices described in the present specification improve upon data visualization methods by automatically updating natural language inputs used to generate data visualizations. Such methods and devices reduce the burden on the user by providing quicker and easier access to a data visualization without the need to manually update every related phrase in the natural language input. When a user modifies a portion of the natural language input without updating related portions of the input, it could trigger an error condition instead of an updated data visualization. In some implementations, when a user modifies a portion of the natural language input, another portion of the natural language input, such as a filter, also needs to be updated. This requires a user to understand the dependencies of different portions of the natural language input. Methods and devices described herein automatically update natural language expressions so that when a user changes one portion of the input, the related portions of the input are automatically detected and updated.

Figure 1:
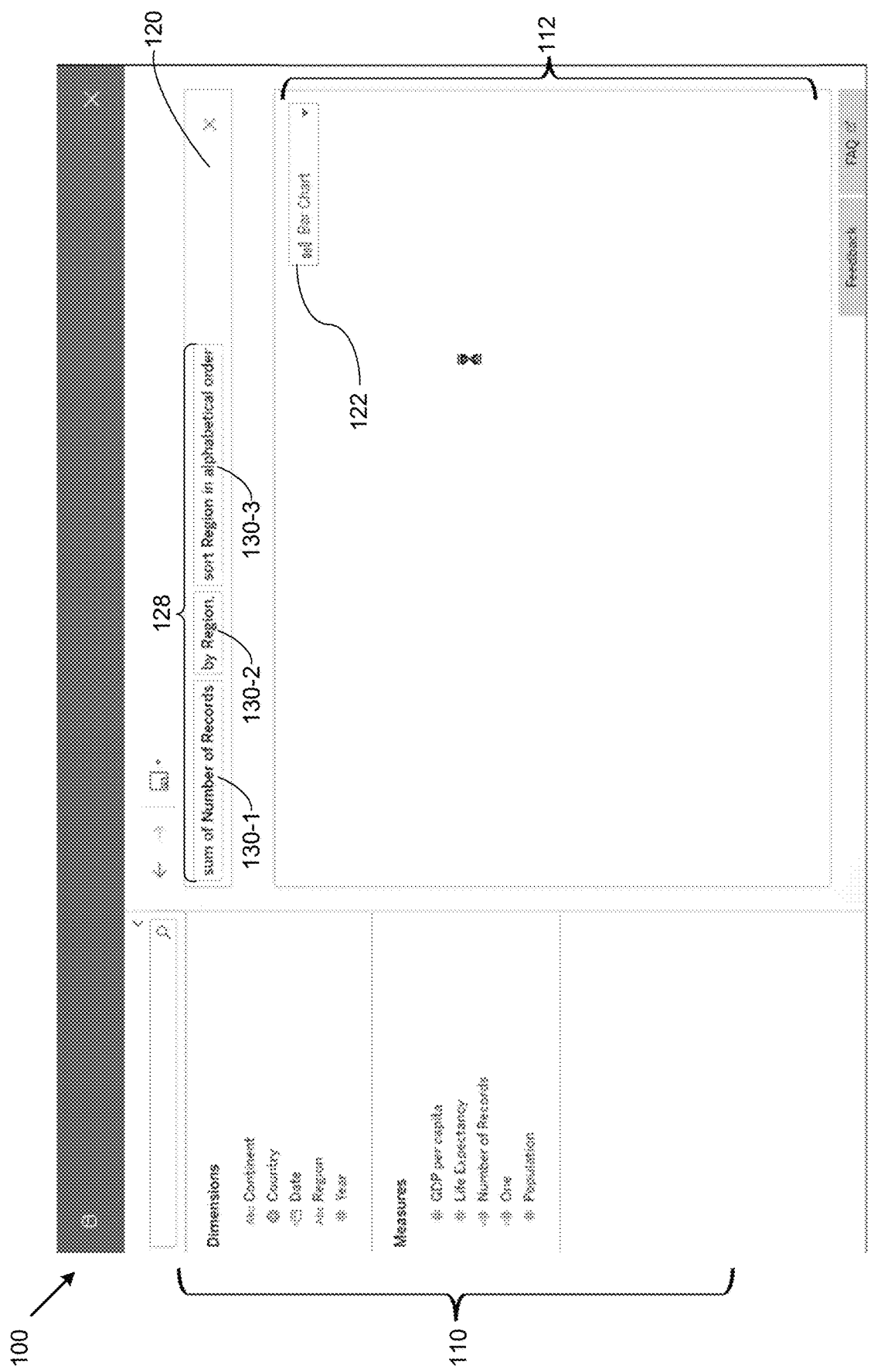
FIG. 1 is a graphical user interface according to some implementations.

FIG. 1 shows a graphical user interface 100 for interactive data analysis. The user interface 100 displays a schema information region 110, which is also referred to as a data pane. The schema information region 110 provides data fields that may be selected and used to build a data visualization. In some implementations, the data fields of a schema are separated into a group of dimensions (e.g., categorical data) and a group of measures (e.g., numeric quantities) in the schema information region 110. The user interface 100 displays a user interface control 120. In some implementations, the user interface control 120 receives and/or displays a natural language input 128 (e.g., expression) from a user. In some implementations, the graphical user interface 100 includes a data visualization region 112 for displaying the data visualization generated based on the input 128 in user interface control 120.

In some implementations, the type of data visualization may be changed by using a view type selector 122. For example, the view type of the data visualization selected in FIG. 1 is "Bar Chart." Additional view types of data visualizations are available, such as a "map," "line chart," "pie chart," "scatter plot," "text table," and "treemap." In some implementations, the data visualization is generated according to a default view type based on the input. In some implementations, the default view type is selected based on a top-ranked visualization type as determined according to data types of the user-selected data fields and/or data values for the user-selected data fields, as described in U.S. Pat. No. 8, 099,674 and U.S. Pat. No. 9,424,318, each of which is incorporated by reference in its entirety. For example, when the input is modified, a different type of data visualization is displayed (e.g., as explained with reference to FIGS. 3E and 3F, where the data visualization type changes from "bar chart" to "text table"). In some implementations, a user specifies the data visualization type as part of the natural language input in the user interface control 120. For example, a user may input (e.g., type in control 120) an additional phrase that specifies "in a bar chart." For example, the computing device may parse the user input "in a bar chart" and update the view type selector to the "bar chart" option.

In some implementations, in response to the type of data visualization being selected from view type selector 122, the computing device displays a phrase in the natural language control 120 that includes the data visualization type. For example, the computing device appends "in a bar chart" to the natural language expression in response to user selection, in the view type selector 122, of a "bar chart."

In some implementations, only view types that make sense for the current expression are provided as options to the user. For example, suppose a user inputs (e.g., types into the natural language control 120) "in a map," but the natural language expression 128 does not include phrases that are not consistent with a map data visualization, the computing device, after parsing the user's natural language input, sets the view type selector 122 to a default data visualization type and does not include a "map" view type option in the dropdown of view type selector 122. For example, the dropdown of view type selector 122 only includes visualization types that make sense based on the natural language input 128.

In some implementations, a data field may be designated as a dimension or as a measure in the database itself (e.g., if the data source is a cube data source). In other implementations, a data visualization application 222 automatically assigns a default role to each data field, which is either a measure or a dimension based on the data type of the data field. For example, numeric fields by default are used as measures, whereas non-numeric fields (e.g., text fields and date fields) by default are used as dimensions. A user can override the assigned default role when appropriate. For example, a numeric "ID" field may be initially classified as a measure, but a user may reclassify the "ID" field as a dimension.

A dimension is a data field that organizes data into categories (also referred to as "buckets"). For example, if a data source includes data associated with the "United States" and the data source includes a data field corresponding to "State," the "State" is used as a dimension. Each dimension creates distinct divisions within a data visualization, such as separate bars in a bar chart (e.g., a separate bar for each state). These divisions are typically labeled with dimension headers, with one header for each corresponding dimension value (e.g., each bar may be labeled with the name of the corresponding state).

A measure is a data field that is used to measure something, such as sales amount, profit, or order quantity, and is typically continuous. For example, whereas the dimension 'State' has a fixed set of discrete possible values, a 'Sales Amount' data field can have any value within a large range. A significant number of records could include a variety of small sales amounts correlating to lower-priced items and many other records may include larger amounts of sales for higher-priced items. Each measure is typically aggregated to a single value (e.g., by default measures are summed) at a level of detail (grouping) according to the selected dimensions (e.g., sales may be aggregated by state).

As illustrated in FIG. 1, the natural language input control 120 is used to input and display a natural language expression 128. The natural language processor 228 has parsed the expression 128 into three distinct phrases 130-1, 130-2, and 130-3. In some instances, one or more of the phrases consists of sub-phrases.

Figure 2:
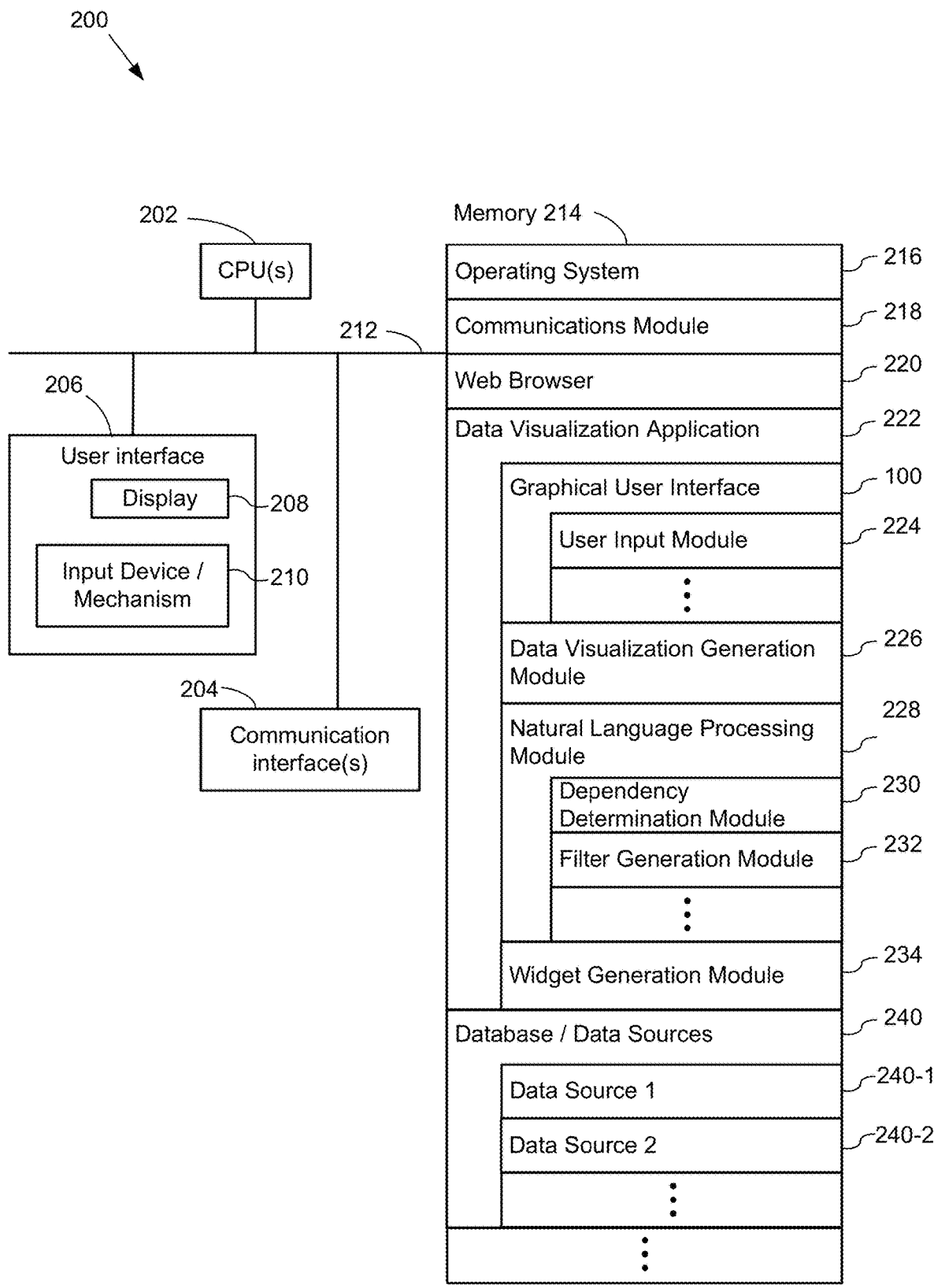
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 222. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory device(s) within the memory 214, comprises a non-transitory computer-readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222. In some implementations, the data visualization application 222 also includes:
  - a graphical user interface 100 for a user to construct visual graphics. In some implementations, the graphical user interface includes a user input module 224 for receiving user input, through a natural language control 120. For example, a user inputs a natural language expression 128 (e.g., via the control 120), identifying one or more data sources 240 (which may be stored on the computing device 200 or stored remotely) and/or data fields from the data source(s). The selected fields are used to define a visual graphic. The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server;
  - a data visualization generation module 226, which takes the user input (e.g., the natural language input), and generates a corresponding visual graphic (also referred to as a "data visualization" or a "data viz");
  - a natural language processor 228, which receives and parses the natural language input provided by the user. The natural language processor 228 may also include a dependency determination module 230, which looks up dependencies in a database 240 to determine how particular terms and/or phrases are related (e.g., dependent). In some implementations, the natural language processor 228 includes a filter generation module 232, which determines if one or more filters are related to a field that has been modified by a user. The filter generation module 232 generates the one or more filters based on a change to the field;

a widget generation module 234, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field.

zero or more databases or data sources 240 (e.g., a first data source 240-1 and a second data source 240-2), which are used by the data visualization application 222. In some implementations, the data sources are stored as spreadsheet files, CSV files, XML files, flat files, or JSON files, or stored in a relational database.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
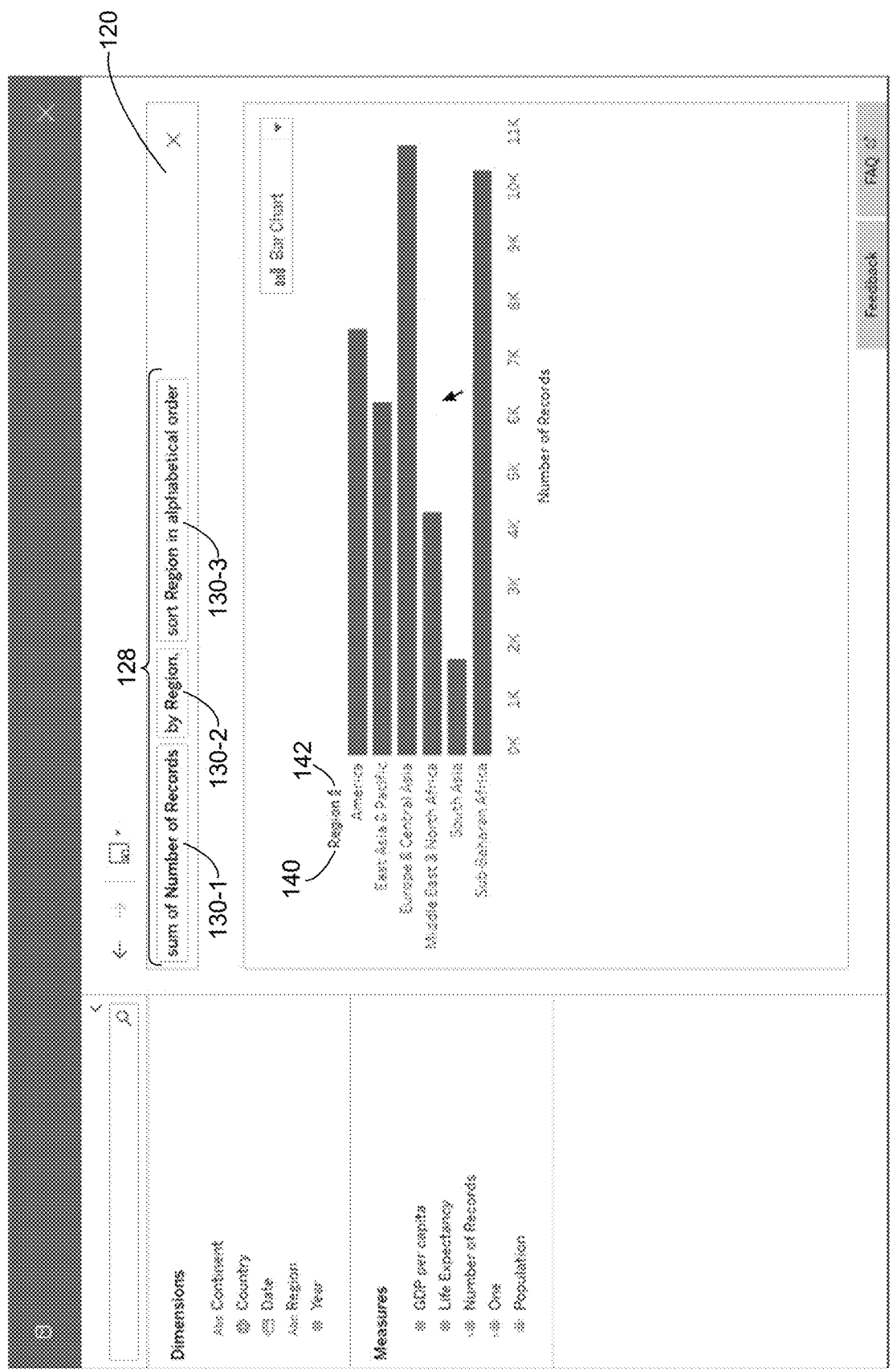
FIGS. 3A-3F provide a series of screen shots for a graphical user interface for updating a natural language input according to some implementations.

FIGS. 3A-3F provide a series of screen shots for a graphical user interface 100. A user can interact with the natural language control 120 to update the expression 128. The natural language expression 128 in FIG. 3A includes three distinct phrases 130-1, 130-2, and 130-3. Each phrase is separately identified (e.g., within a separate text box), including: "sum of Number of Records" 130-1, "by Region" 130-2 (e.g., where "by" denotes a Group By function), and "sort Region in alphabetical order" 130-3. Typically, each phrase 130 includes one or more terms that identify data fields from a data source 240. A term may be a dimension or a measure. The natural language input may include more than one term. As shown in FIG. 3A, an initial data visualization representing the natural language input is displayed in the graphical user interface. For example, FIG. 3A shows a bar chart representing the number of records by region sorted in alphabetical order. The "Region" column header 140 indicates that each row of the bar chart corresponds to a region, and the sort indicator 142 indicates that the rows are currently sorted in alphabetical order (as specified by the third phrase 130-3).

Figure 3B:
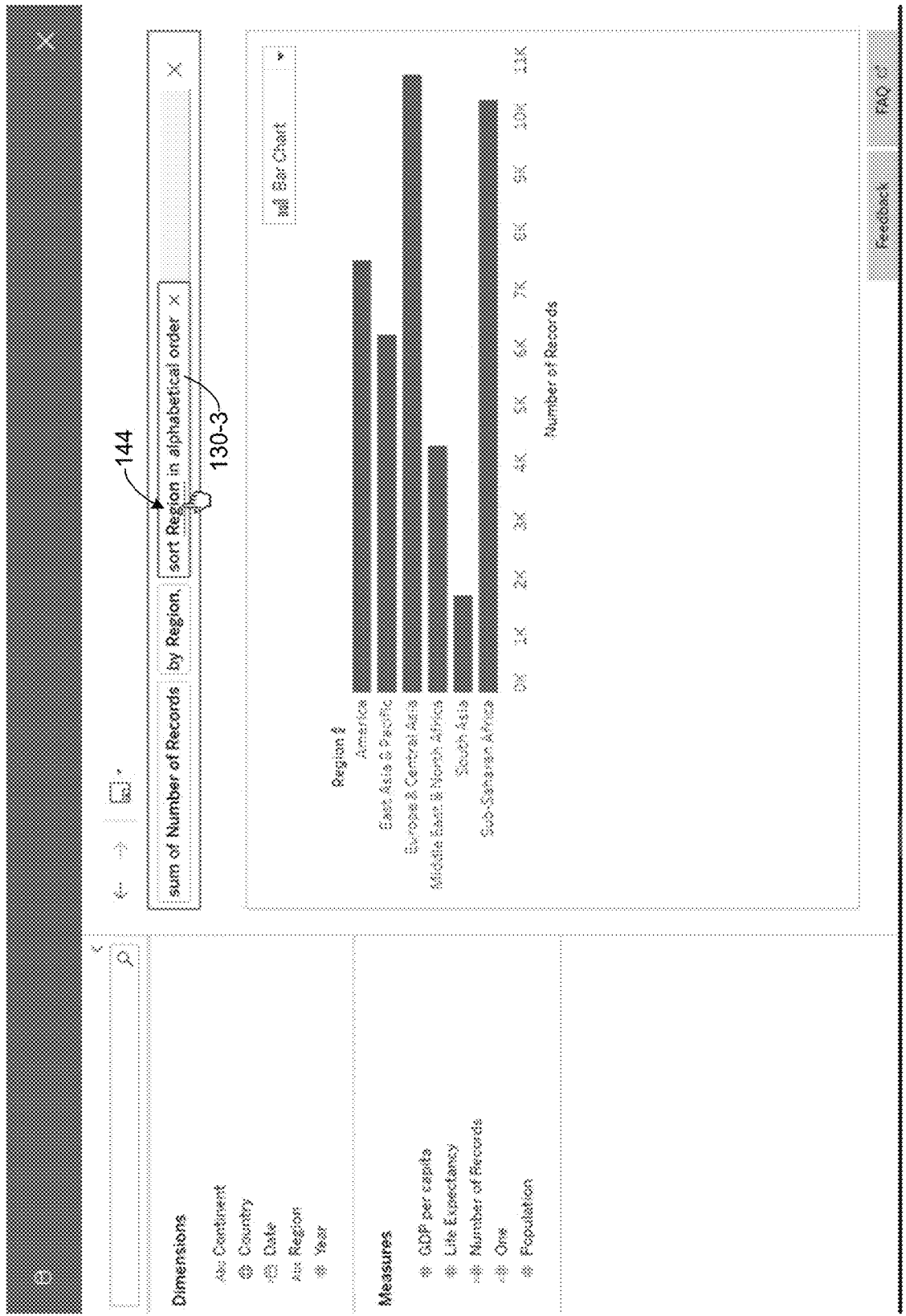
Figure 3C:
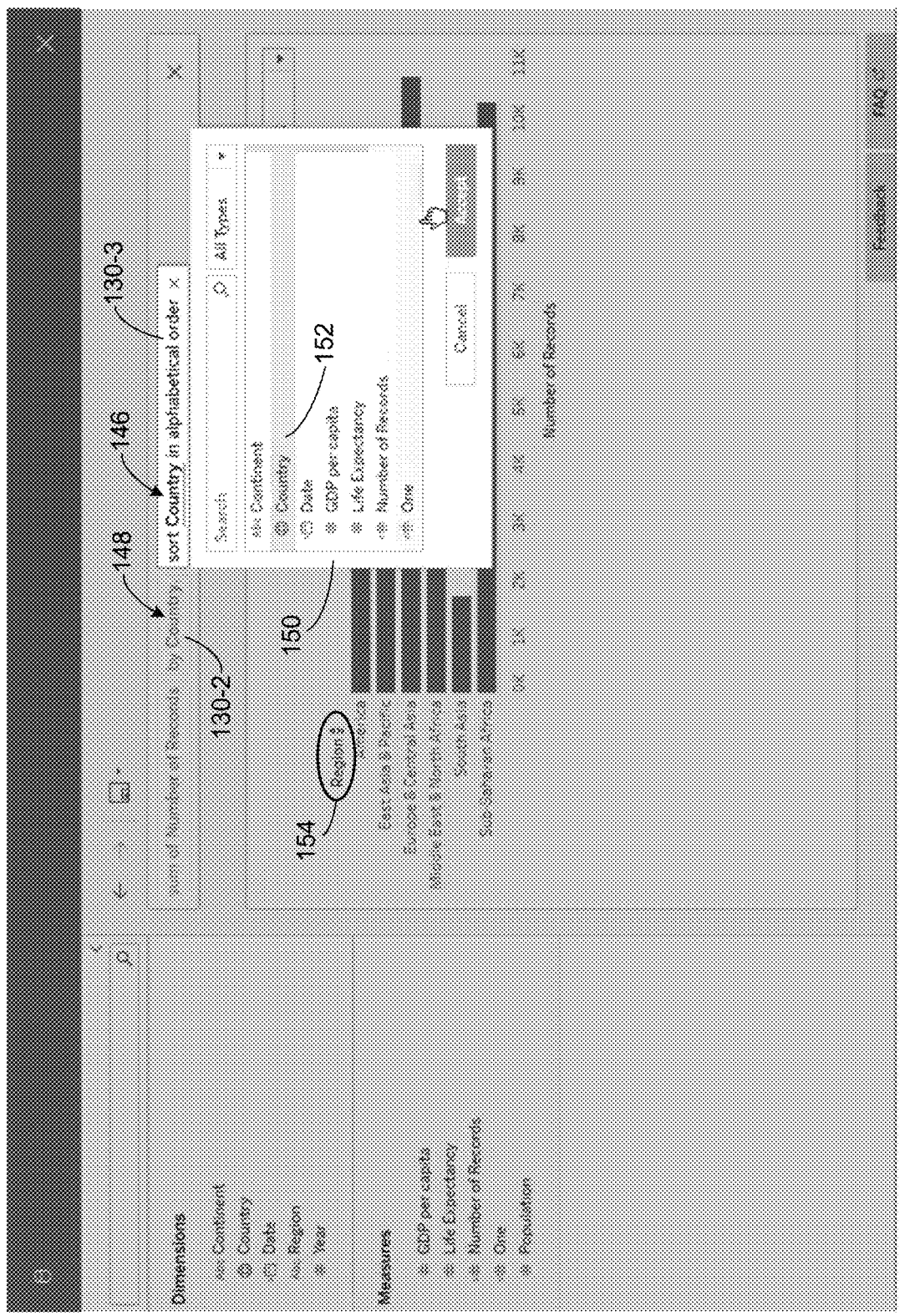

In some instances, a user selects (e.g., via a mouse click, hover, or other input) a first term in the natural language expression. For example, FIG. 3B illustrates a user hovering over the term "Region" 144 in the third phrase "sort Region in alphabetical order" 130-3. In some implementations, in response to the user selection, the term is visually distinguished within the natural language input. For example, the selected term "Region" 144 is underlined in response to the user hovering over the term. In some implementations, in response to the user selection, a widget is generated (e.g., using the widget generation module 234), as shown in FIG. 3C. For example, the widget 150 prompts the user with user-selectable options (e.g., including alternative terms) to replace the selected term 144. The user in FIG. 3C selects the "Country" option 152 from the widget. In response to the user's selection, the first term "Region" 144 is replaced with the selected term "Country" 146 in the third phrase "sort [term] in alphabetical order" 130-3.

In some instances, a second phrase (or a term within a second phrase) is dependent on the edited phrase (or the edited term within the edited phrase). For example, the second phrase "by Region" 130-2 is dependent on the third phrase "sort Region in alphabetical order" 130-3 because the sorting field must be compatible with the grouping field. In some implementations, the dependency of terms and/or phrases is determined by performing a lookup in a database storing data and information on how the data is related. In some instances, phrases that include an overlapping term are dependent phrases. For example, where both phrases use the term "Region," the computing device may determine that the phrases are dependent phrases. Here, when the user replaces the term "Region" with "Country" in the third phrase 130-3, if the second phrase "by Region" 130-2 were not updated, the computing device would raise an error. The system cannot sort by Country when the requested data has not been grouped by country. Instead of raising an error, the computing device automatically determines that the second phrase "by Region" 130-2 must also be updated in order to prevent returning an error based on the user input. This improves the user experience because the user is not required to manually update the second phrase in order to prevent the error.

Figure 3D:

In accordance with a determination that the second phrase is dependent on the third phrase, the user's input to replace the term "Region" 144 with the term "Country" 146 in the third phrase also causes the computing device to update the second phrase 130-2, replacing "Region" with "Country" 148. The second phrase is updated by the computing device automatically without user input (e.g., the user does not manually change "by Region" to "by Country" after modifying the first term). Note that the column header and sort indicator 154 are not yet updated in FIG. 3C because the change has not yet been committed. The resulting updated natural language expression is shown in FIG. 3D. Further, FIG. 3D illustrates an updated data visualization representing the updated natural language expression, now sorting the bars in the bar chart by country in alphabetical order, as indicated by the updated column header and sort indicator 156.

Figure 3E:
Figure 3F:
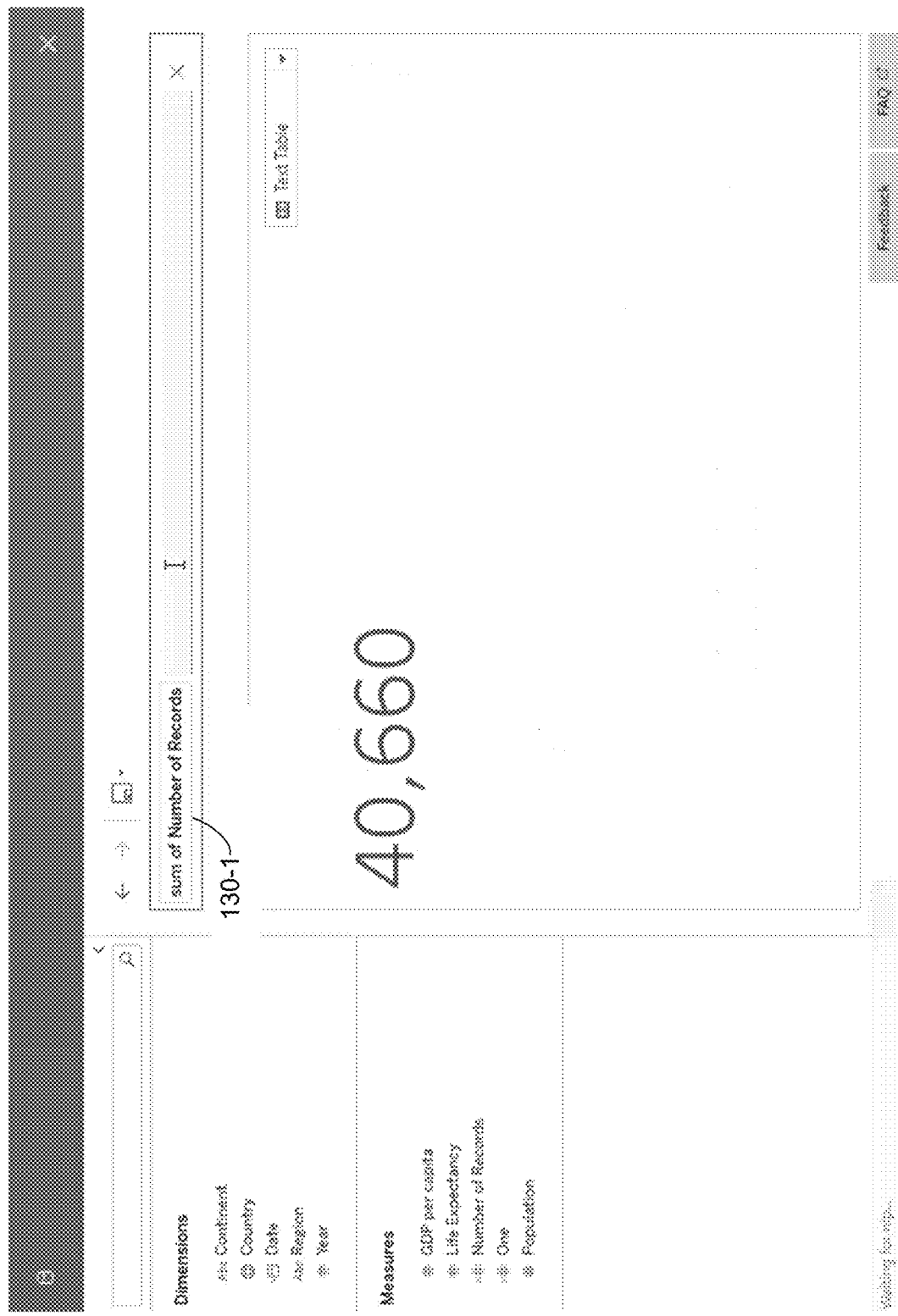

FIGS. 3E and 3F illustrate another example of a user input modifying a term in a phrase, which causes the device to update another phrase (e.g., that is dependent on the first phrase). For example, the user input in FIG. 3E illustrates a user hovering over the second phrase "by Country" 130-2. In some implementations, the phrases in the natural language expression are removable (e.g., may be deleted) by a user input selecting an "x" option 158 (e.g., illustrated in FIG. 3E with a user input indication hovering over the "x" option 158). For example, the "x" option 158 is dynamically generated in response to a user input (e.g., hover) over the text box that includes the phrase. In this example, the computing device determines that the second phrase "by Country" 130-2 and the third phrase "sort Country in alphabetical order" 130-3 are dependent on each other. FIG. 3E illustrates an initial data visualization of a bar chart representing a number of records grouped by country and sorted in alphabetical order.

The user input modifies the second phrase 130-2 by removing the second phrase from the natural language expression 128. In response to removing the second phrase "by Country" 130-2, the computing device updates the third phrase "sort Country in alphabetical order" 130-3 by removing the third phrase. The resulting updated natural language expression is shown in FIG. 3F. As shown in the Figure, the second phrase "by Country" 130-2 is removed and the third phrase "sort Country in alphabetical order" 130-3 is automatically removed by the computing device without user input. For example, the user only selected the "x" option 158 for the second phrase, and the computing device, determining that the third phrase is dependent on the second phrase, automatically removed the third phrase instead of raising an error. Thus, the user did not need to manually remove the third phrase in order to fix the expression. FIG. 3F also shows the updated data visualization corresponding to a text table representing the phrase 130-1, "sum of Number of Records." Because there is no data field to specify grouping, all of the rows of data are grouped together to create a single total.

As illustrated by the examples above, the computing device determines how a first phrase is modified by a user and updates one or more dependent phrases based on the modification. In some implementations, the computing device updates a term of a second phrase based on a modification to a first phrase. In some implementations, the computing device removes the second phrase based on modification to the first phrase.

Figure 4A:
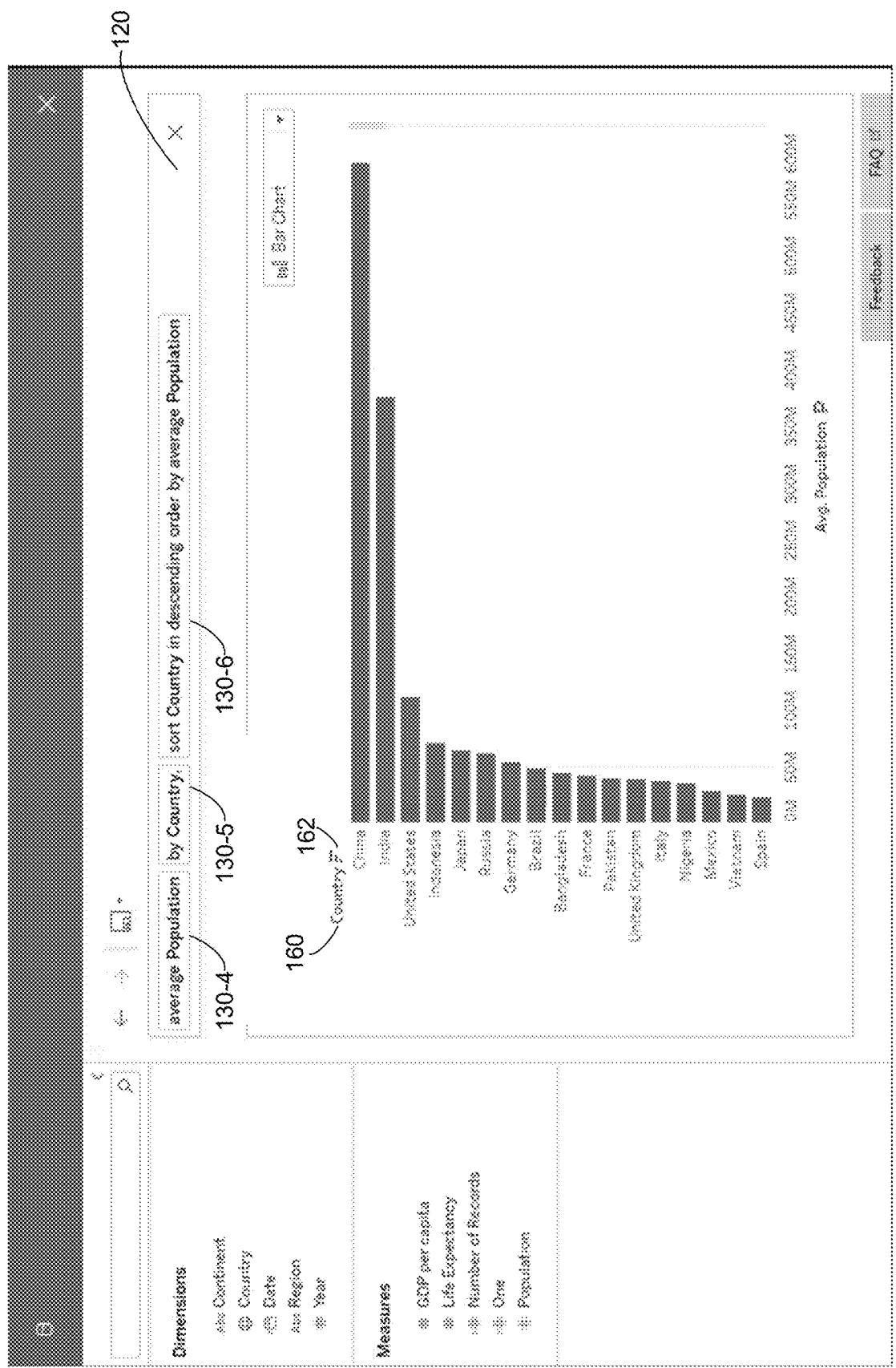
FIGS. 4A-4E provide a series of screen shots for a graphical user interface for updating data visualizations based on changes to natural language input according to some implementations.
Figure 4B:
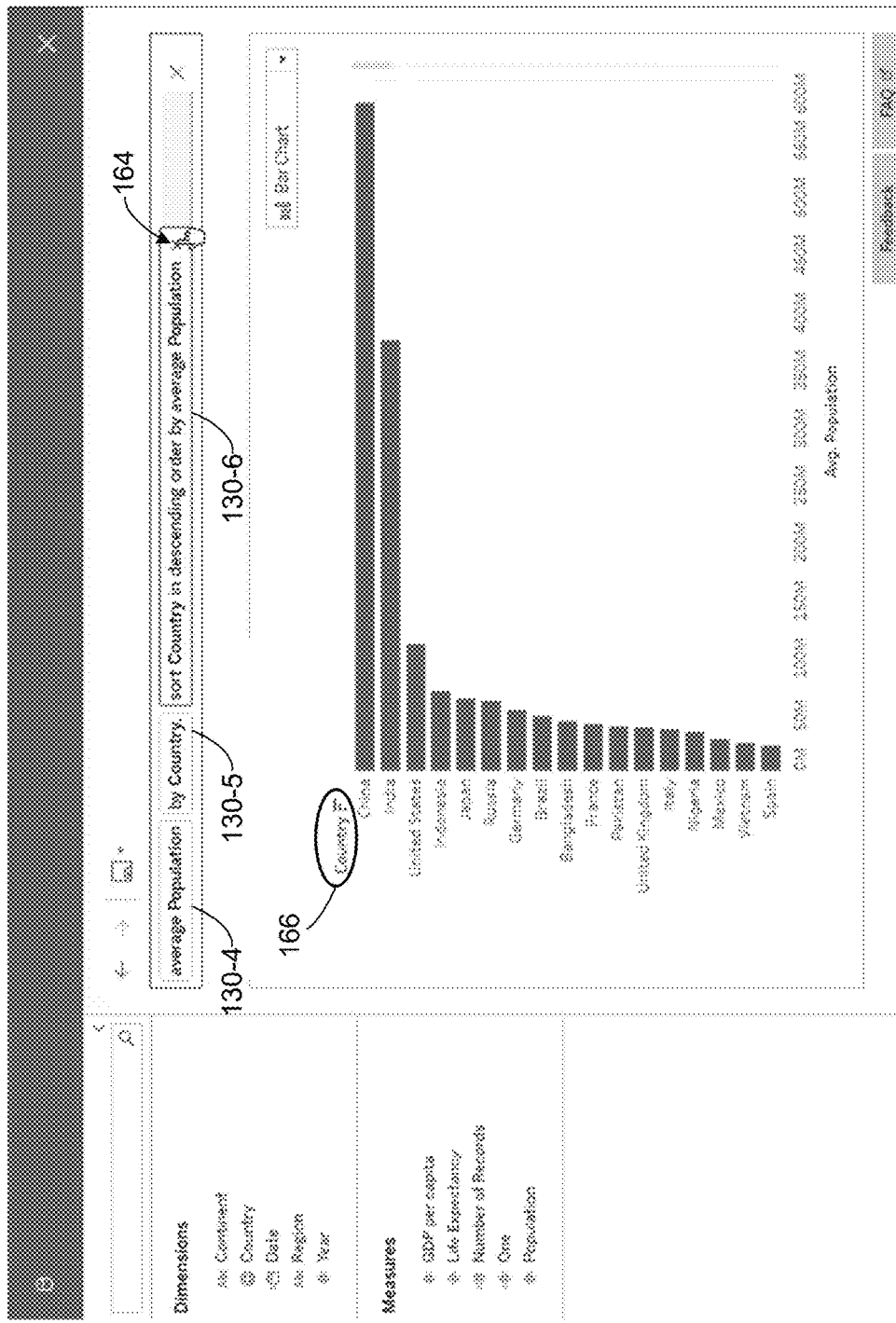
Figure 4C:
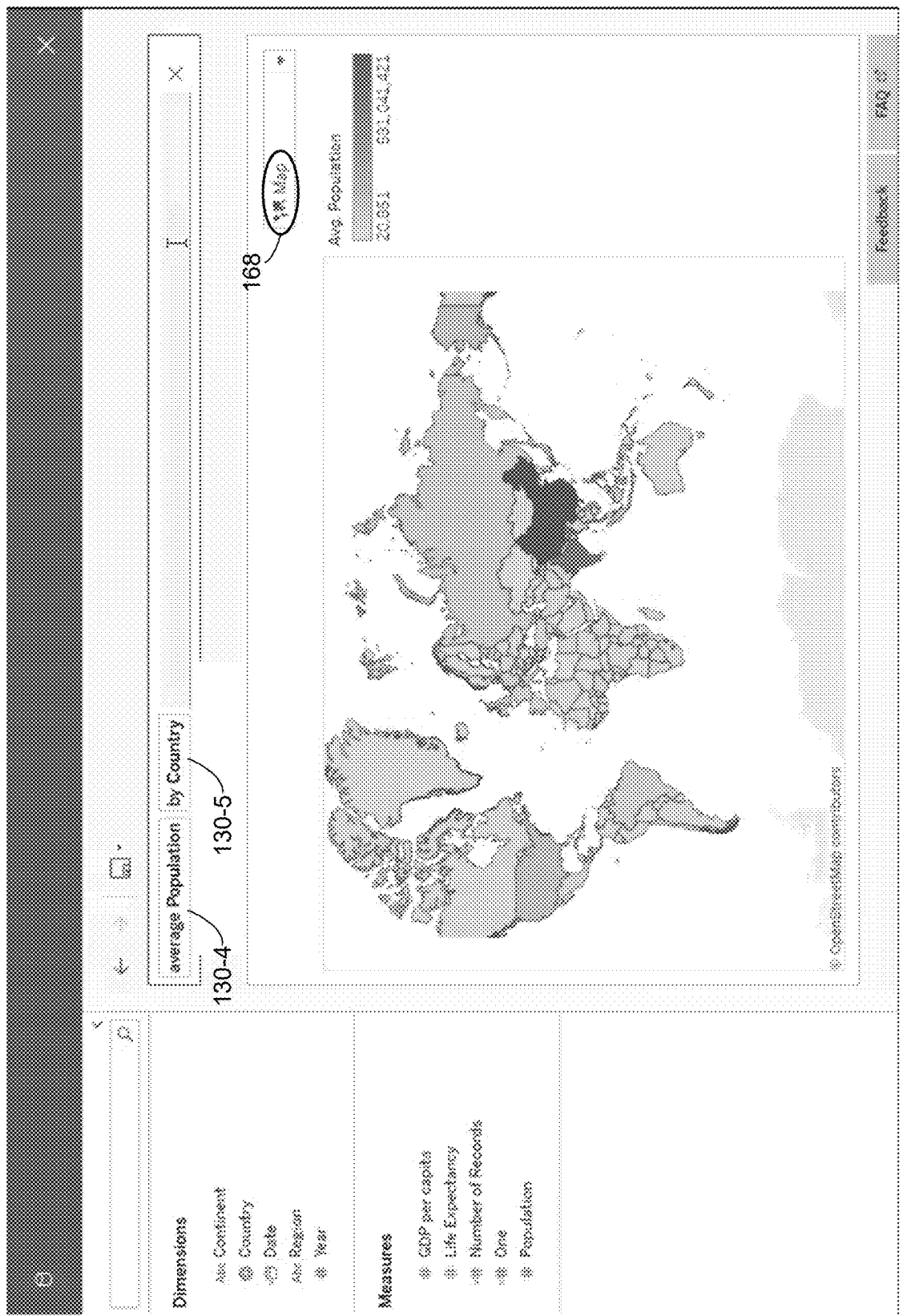

FIGS. 4A-4E provide a series of screen shots for a graphical user interface 100, which updates the view type of the data visualization based on changes to natural language input. In some implementations, the computing device automatically generates (e.g., using the data visualization generation module 226) a type of data visualization based on the natural language input. In some implementations, a modification (e.g., received from a user input) to the natural language input (e.g., via a natural language control 120) causes the computing device to change the type of data visualization presented to the user. For example, in FIG. 4A, the natural language input includes three distinct phrases: "average Population" 130-4, "by Country" 130-5, and "sort Country in descending order by average Population" 130-6. The view type of the data visualization is a bar chart. As indicated by the column header 160, the bar chart has bars for each country, and the sort indicator 162 illustrates that the data is sorted in descending order. FIG. 4B illustrates a user input (e.g., hovering) on the third phrase 130-6 "sort Country in descending order by average Population." In response to the user hovering on the phrase 130-6, the computing device dynamically generates an "x" option 164, which the user can select to remove the phrase 130-6. In response to the user removing the third phrase (e.g., by selecting the "x" option 164) in the natural language input, the computing device determines that without the phrase that includes "sort", a default type of data visualization should be a map. This works because the natural language input only includes the two phrases "average Population" 130-4 and "by Country" 130-5. This is shown in FIG. 4C. In some implementations, a user can change the data visualization from the default type of data visualization. For example, the default type of data visualization "map" is shown in the dropdown control 168. Alternative types of data visualization are presented to the user via the dropdown control 168 so that a user can modify the type of data visualization shown in the graphical user interface.

Figure 4D:
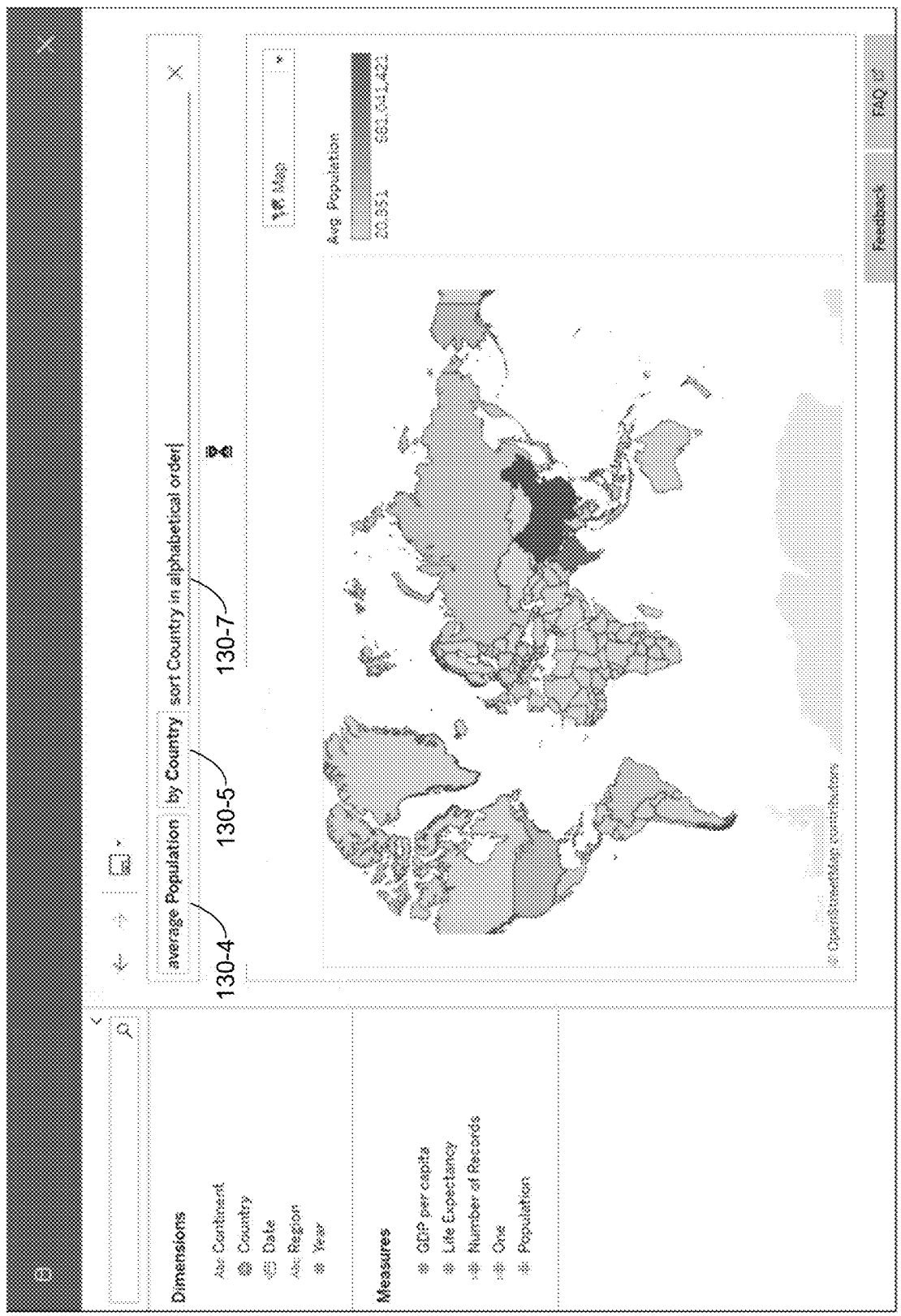
Figure 4E:
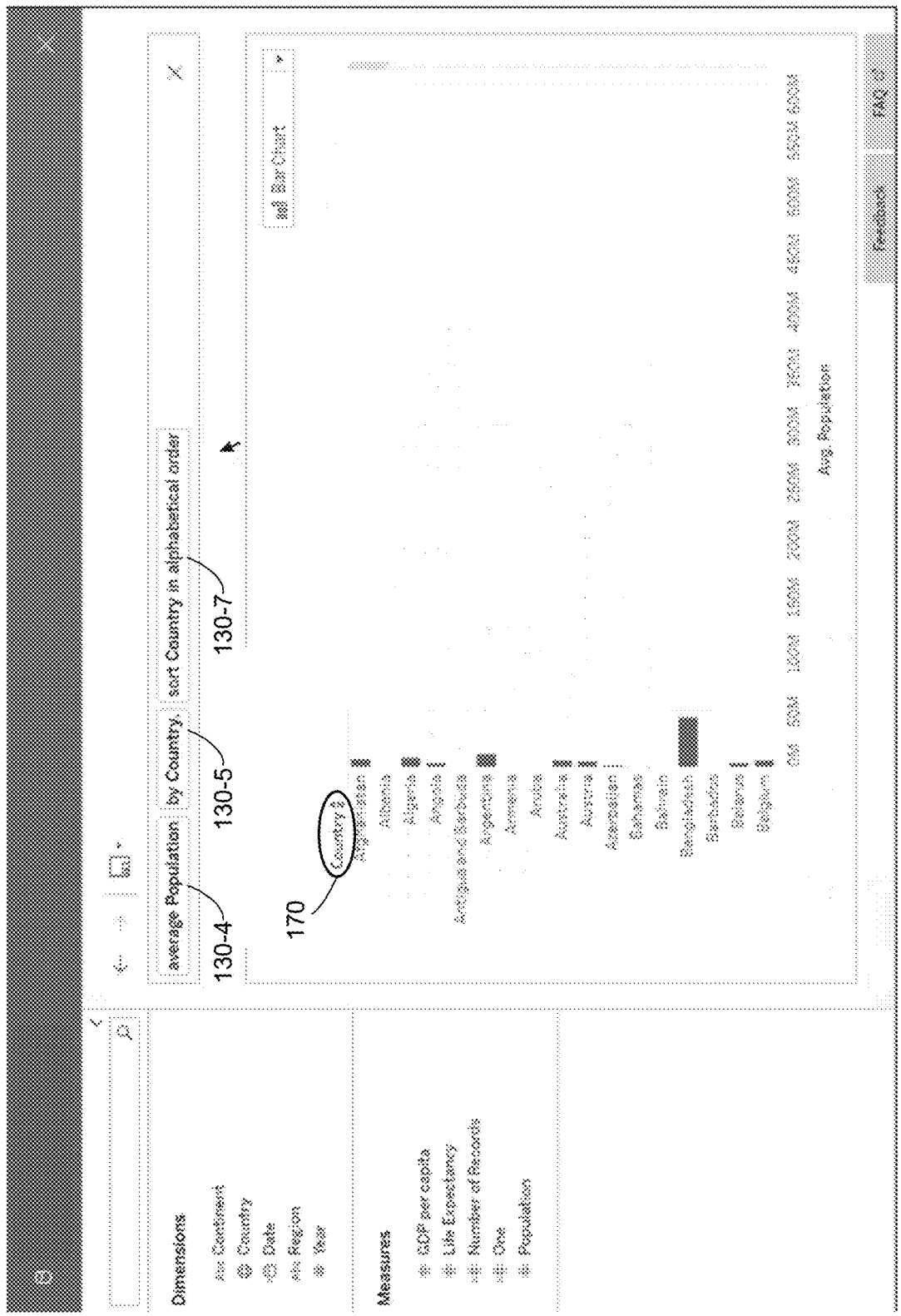

FIG. 4D shows another example of updating the data visualization. In FIG. 4D, a user inputs (e.g., by typing) an additional phrase 130-7 into the natural language input (e.g., via the natural language input control 120). In response to receiving the user input, FIG. 4E illustrates that the computing device changes the data visualization from the map view in FIG. 4D to a bar chart view in FIG. 4E. The bar chart in FIG. 4E represents the updated natural language expression, showing the average population by country sorted by the country in alphabetical order. The column header and sort indicator 170 illustrate that each row of the bar chart corresponds to a Country and the rows are sorted in alphabetical order (e.g., as specified by the additional phrase 130-7).

Figure 5A:
FIGS. 5A-5D illustrate updating filters specified in a natural language input according to some implementations.

FIGS. 5A-5D illustrate updating filters in a natural language expression 500 according to some implementations. FIG. 5A illustrates a natural language input 500 that has three phrases 502-1, 502-2, and 502-3, each corresponding to a data field. A filter phrase (such as the third phrase 502-3) compares a data field to a specific value or another data field, such as [data field] [relation] [comparison value]. The most common relations are =, ≠, >, ≥, <, and ≤. In some instances, a phrase 502 of the natural language input 500 follows a natural language template (e.g., stored in a database at the computing device). Based on the natural language template and natural language processing, the computing device determines how to update (e.g., or automatically complete) the phrase based on the user input. For example, when a first term of the phrase is a category, the template identifies that a categorical filter is proper to update the phrase. As another example, when a first term of the phrase is a numeric data field, the template identifies that a quantitative filter is proper to update (e.g., complete) the phrase.

In some implementations, user input (e.g., hovering) within the user interface control 120 selects the term "Country" 514. In response to the user hovering over the term (e.g., data field) "Country" 514 the computing device automatically (e.g., without user input) correlates the partial input with a template phrase, and sets a default value (e.g., "Argentina" 516) for a second template field for the phrase. In particular, the computing device determines that the user has selected a dimension (the data field "Country" 514), which requires a categorical value for comparison. The default comparison value is a data value for the Country data field 514. In this way, selection of the data field "Country" 514 causes the computing device to complete the phrase template with "Argentina" 516. These actions occurred before the screen shot in FIG. 5A. As shown in FIG. 5A, a data visualization of a map is shown in the graphical user interface (the map is partially hidden behind the drop-down widget 518), which reflects filtering the Country 514 to "Argentina" 516.

In FIG. 5A, the user has taken another action (e.g., clicking on the Country term 514) to open the data field selection widget 518. As shown in FIG. 5A, the Country field option 520 is currently selected. Based on a filter for Country 514, a comparison value of "Argentina" 516 makes sense. However, once the user selects the Population option 522 in FIG. 5B, comparing Population to the string "Argentina" no longer makes sense.

Figure 5B:

In FIG. 5B, the user input (e.g., hovering) within the widget 518 selects the term "Population" 522. The computing device determines that the selected term is quantitative. In response to the user input, the computing device automatically updates the comparison operator 536 (e.g., to "at least" or "≥") and the comparison value 538 for the phrase 502-3. In this example, the computing device completes the phrase with a comparison value of 10,000. For a quantitative data field such as Population 534, an aggregation type must also be selected (e.g., SUM, COUNT, or AVERAGE). In this example, the aggregation type defaults to Average 524, which is displayed as the aggregation type 532 in the third phrase 502-3. In some implementations, the aggregation type defaults to what is already specified in other phrases (e.g., the "Average Population" in the first phrase 502-1). Further, an updated data visualization corresponding to a bar chart is displayed on the graphical user interface based on the updated phrase.

Figure 5C:
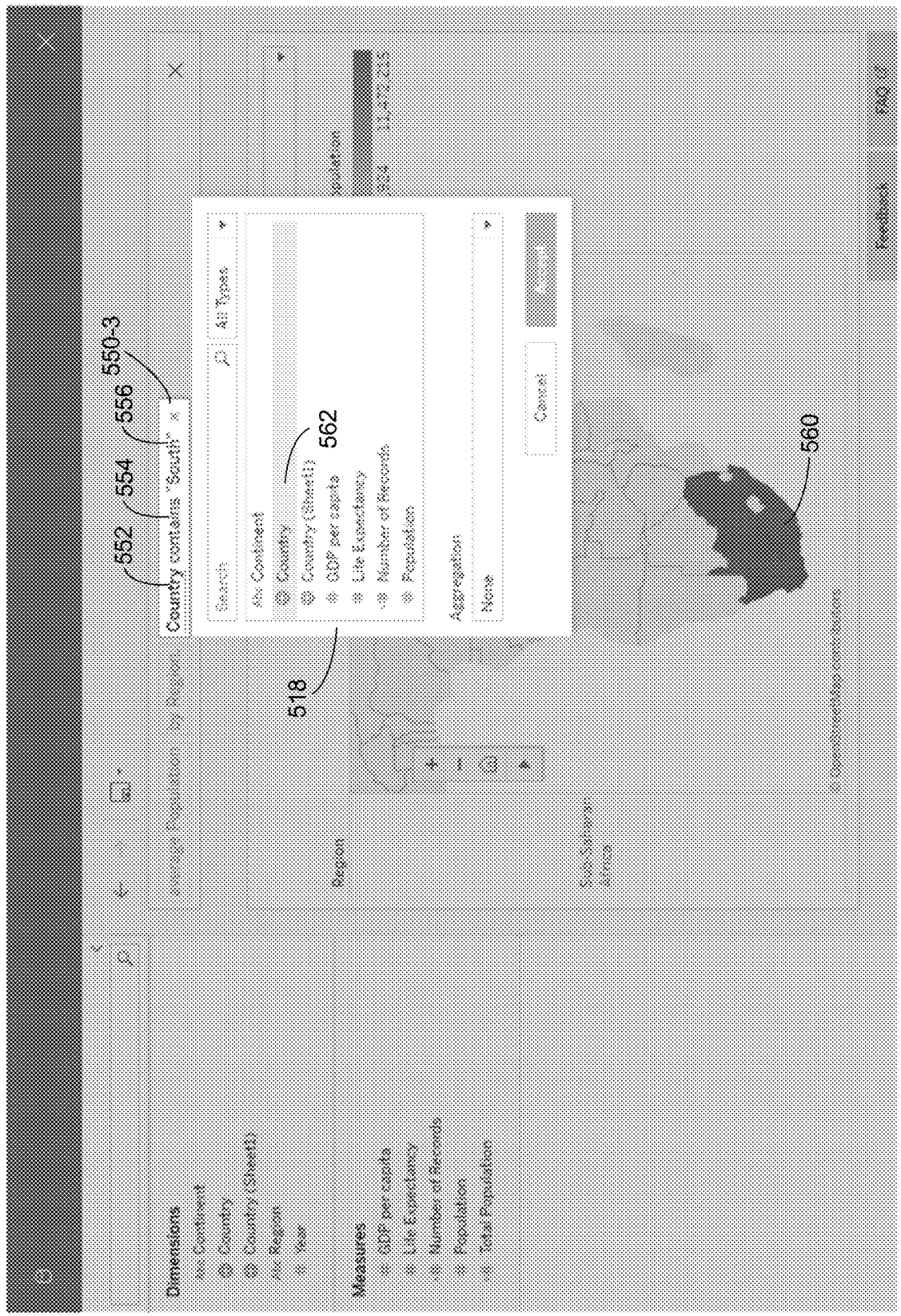

FIG. 5C illustrates a natural language input including the third phrase "Country contains 'South'" 550-3, which has a first data field "Country" 552. The comparison operator 554 is "contains", and the comparison value is "South" 556. In this case, the third phrase 550-3 specifies a filter that limits the data to those whose country names include the text string "South" 556. As shown in the data visualization, the map is showing "South Africa" 560. In FIG. 5C, the user has taken action to bring up the filter widget 518, and the Country option 562 is selected.

Figure 5D:
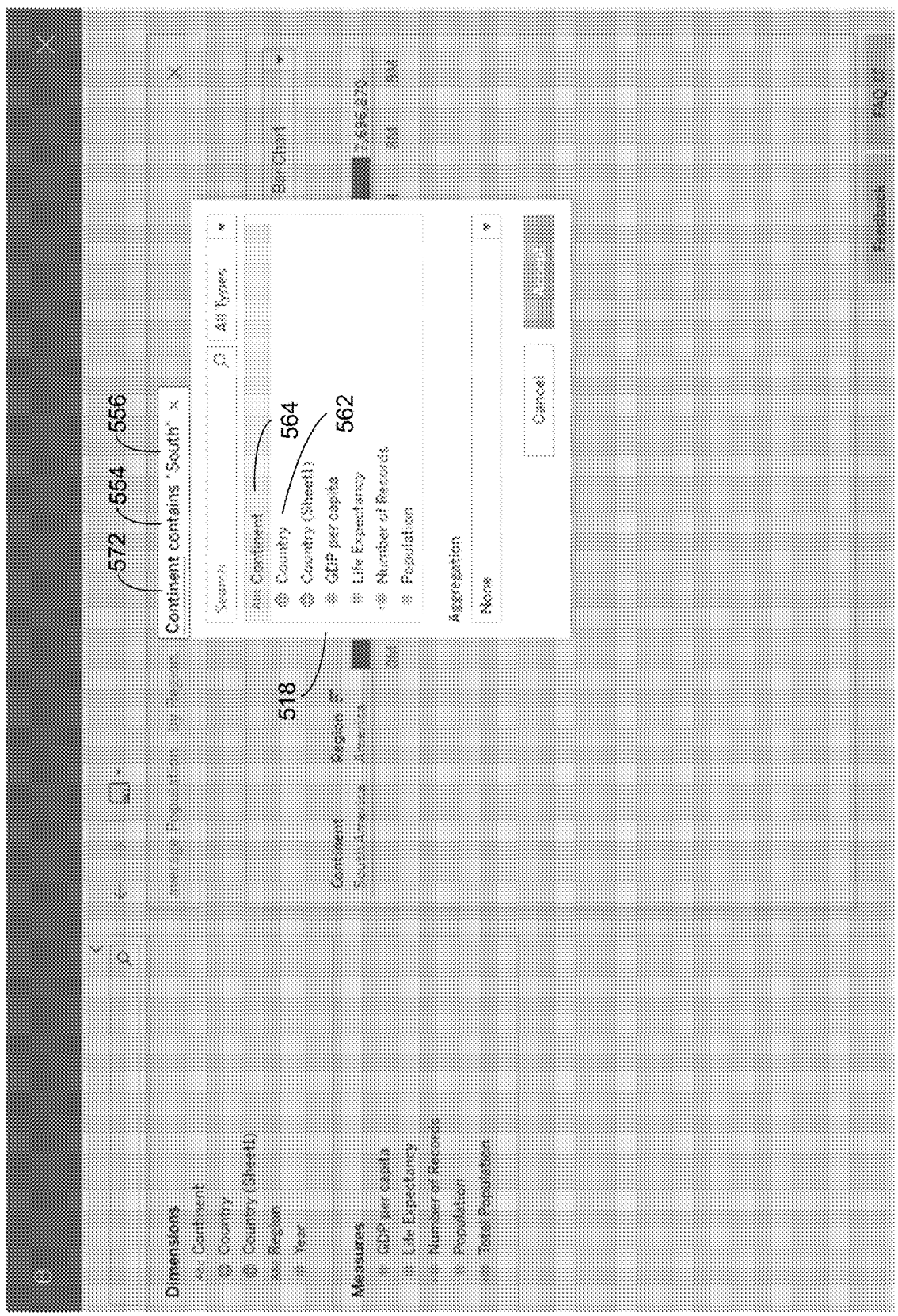

FIG. 5D shows user input switching from the "Country" option 562 to the "Continent" option 564. The computing device determines that both "Country" and "Continent" store categorical data. Thus, the computing device retains the comparison operator 554 and the comparison value 556 for the categorical filter. The categorical filter is still a proper filter (e.g., it does not raise an error) based on the selected new data field "Continent" 572.

Figure 6A:
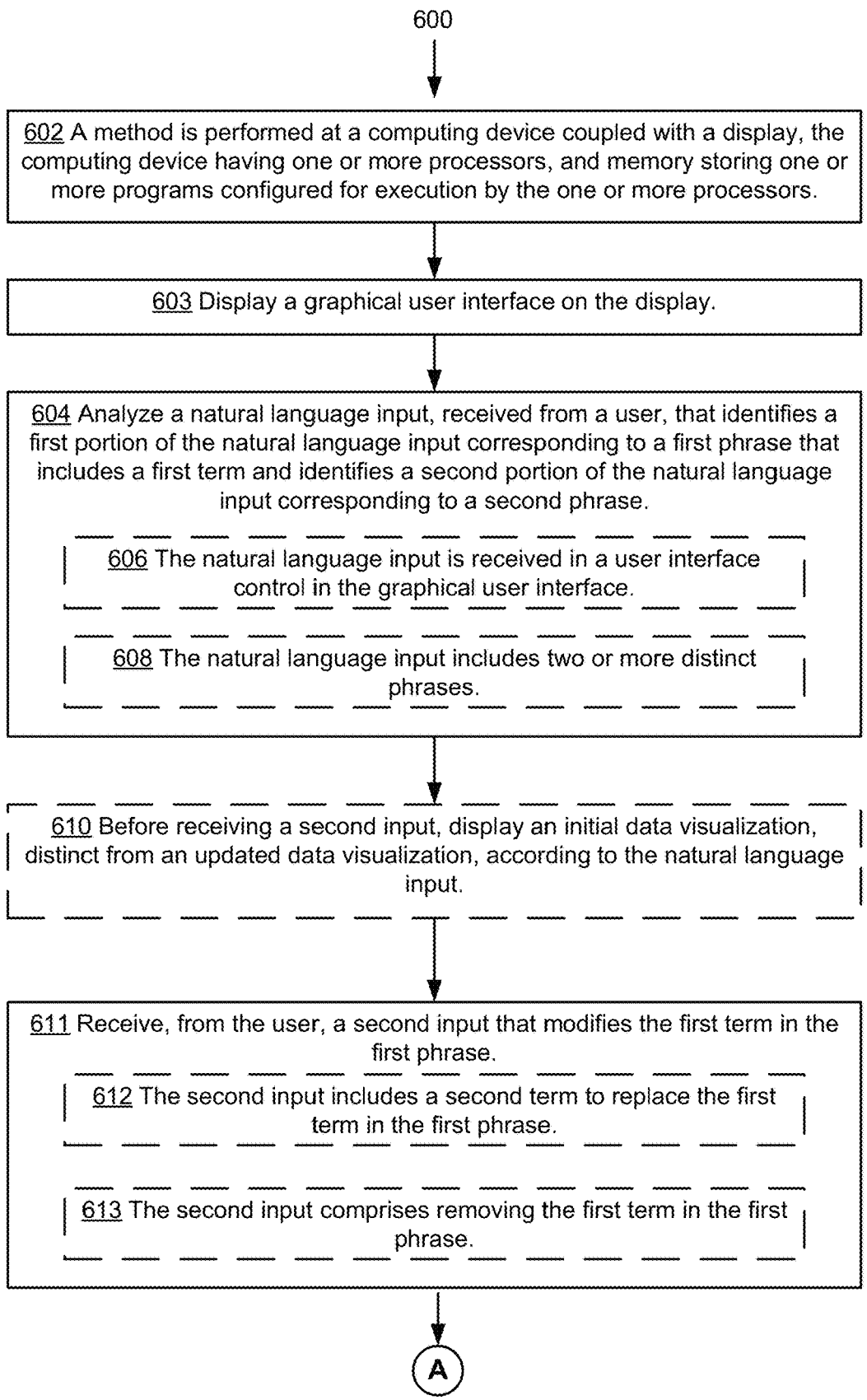

FIGS. 6A and 6B illustrate a method 600 of displaying a data visualization according to a natural language expression. The method 600 is also called a process. In some implementations, the method is executed at and performed by a computing device (602) coupled with a display, the computing device having one or more processors, and memory storing one or more programs configured for execution by the one or more processors. The method 600, as performed by a computing device, is optionally governed by instructions that are stored in a non-transitory computer readable storage medium. The instructions are executed by one or more processors of the computing device. Each of the operations shown in FIGS. 6A and 6B may correspond to instructions stored in computer memory or a non-transitory computer readable storage medium (e.g., the memory 214 of a computing device 200). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 600 may be combined and/or the order of some operations may be changed.

In some implementations, the computing device displays (603) a graphical user interface on the display. For example, the computing device displays the graphical user interface 100 illustrated in FIG. 1.

The computing device analyzes (604) a natural language input, received from a user, to identify a portion of the natural language input corresponding to a first phrase that includes a first term. In some implementations, the natural language input is received (606) in a user interface control 120 in the graphical user interface 100. In some implementations, at least a portion of the natural language input is typed by a user. In some implementations, at least a portion of the natural language input is selected, by the user, from a plurality of options provided by the computing device. In some implementations, only a portion of the natural language input is received from the user and the natural language input is automatically completed by the computing device (e.g., the computing device predicts and/or suggests how to complete the natural language input). For example, the user may input (e.g., type) "sum of Number of Records," "by Region" and "sort," and the computing device will complete the natural language input, based on the user input, with a default phrase (e.g., "Region in alphabetical order). In some implementations, the natural language input includes (608) two or more distinct phrases. For example, the natural language input (e.g., expression) shown in FIG. 1 comprises three distinct phrases: "sum of Number of Records", "by Region", and "sort Region in alphabetical order." In some implementations, the graphical user interface 100 distinguishes between the two or more distinct phrases by displaying each phrase in a separate user interface element (e.g., a text box).

In some implementations, before receiving a second input, the computing device displays (610) an initial data visualization, distinct from an updated data visualization, according to the natural language input. For example, the data visualization (e.g., bar chart) shown in FIG. 3A is displayed in the graphical user interface. The data visualization is displayed according to the natural language input (e.g., the bar chart illustrates the Number of Records by region, sorted in alphabetical order).

The computing device receives (611) from the user, a second input that modifies the first term in the first phrase. In response to receiving the second input, the computing device updates (614) a second phrase (in the natural language input) based on the second input. In some implementations, the second phrase is updated automatically and without user input. In some implementations, before updating the second phrase, the computing device indicates (e.g., on the graphical user interface) how the second input will update the second phrase. For example, the computing device shows to the user that removing a first phrase (e.g., "by Country") will cause the computing device to also remove (e.g., automatically) a second phrase (e.g., "sort Country in alphabetical order"). This indication illustrates to the user how different phrases depend on (e.g., affect) each other.

In some implementations, the second input includes (612) a second term to replace the first term. In some implementations, updating the second phrase based on the second term removes (622) a third term from the second phrase and adds the second term to the second phrase to replace the third term. For example, the computing device updates at least a portion of the second phrase to match the change to the first phrase. For example, FIGS. 3B-3D show a sequence of screen shots for a graphical user interfaces where the first term (e.g., "Region") in the first phrase (e.g., "sort Region in alphabetical order) is modified by replacing the first term with a second term (e.g., "Country"). For example, a user provides the second input (e.g., selects "Country" from a set of terms presented in a dropdown menu) in FIG. 3C. The selected second term (e.g., Country) modifies (e.g., replaces) the first term (e.g., Region) in the natural language input. In response to the second input from the user selecting the second term (e.g., "Country") to replace the first term (e.g., "Region") in the first phrase (e.g., "sort Region in alphabetical order"), the computing device updates a second phrase (e.g., "by Region") by removing a third term (e.g., Region) from the second phrase ("by Region") and adding the second term ("Country") to the second phrase to replace the third term (e.g., "by Region" is replaced with "by Country"). FIG. 3D illustrates the resulting natural language input, where the second phrase "by Region" has been updated to "by Country" in response to the second input modifying the first phrase to "sort Country in alphabetical order."

In some implementations, the second input removes (613) the first term in the first phrase. In some implementations, updating the second phrase based on the second term removes (624) the second phrase. For example, FIGS. 3E and 3F illustrate a sequence of screen shots for a graphical user interface where a first term in the first phrase (e.g., the term "Country" in the phrase "by Country") is removed (e.g., as indicated by a user input selecting the "x" next to the phrase, within the phrase text box, to remove the phrase). In some implementations, all of the first phrase (e.g., including the first term) is removed by the second input. In some implementations, in response to removing the first phrase (e.g., "by Country"), the computing device updates the second phrase. For example, the computing device removes the second phrase (e.g., "sort Country in alphabetical order) because the first phrase "by Country" has been removed by the second input.

In some implementations, the computing device performs (616) a lookup in a database to determine that the second phrase is dependent on the first term of the first phrase. Updating the second phrase is performed in accordance with a determination that the second phrase is dependent on the first term of the first phrase. In some implementations, the second phrase is dependent on the first term of the first phrase if modifying the first phrase without modifying the second phrase would raise an error condition. For example, the computing device updates the second phrase so that the updated natural language input can generate a data visualization.

In response to updating the second phrase based on the second input (626), the computing device displays (628), on the graphical user interface, an updated natural language expression that comprises the modified first phrase and the updated second phrase, and displays (630) an updated data visualization representing the updated natural language expression. For example, FIG. 3A illustrates an initial data visualization representing the natural language input, showing the number of records by region and FIG. 3D illustrates an updated data visualization representing the updated natural language input, showing number of records by country. As another example, FIG. 3E illustrates an initial data visualization as a bar chart before the second input and FIG. 3F illustrates the updated data visualization (e.g., text table showing "40,660") after the second phrase has been updated in response to the second input.

In some implementations, the second phrase comprises (618) a sub-portion of the first phrase, and updating the second phrase based on the second input comprises updating the sub-portion of the first phrase. For example, the first phrase includes the first term and includes the second phrase. Thus, in response to the second input, the computing device updates another term within the same phrase (e.g., the first phrase).

In some implementations, the first phrase and the second phrase are (620) distinct phrases. For example, the examples described above with reference to FIGS. 3A-3F illustrate instances where the first phrase is distinct from the second phrase (e.g., the second phrase is not a sub-portion of the first phrase).

Figure 7:
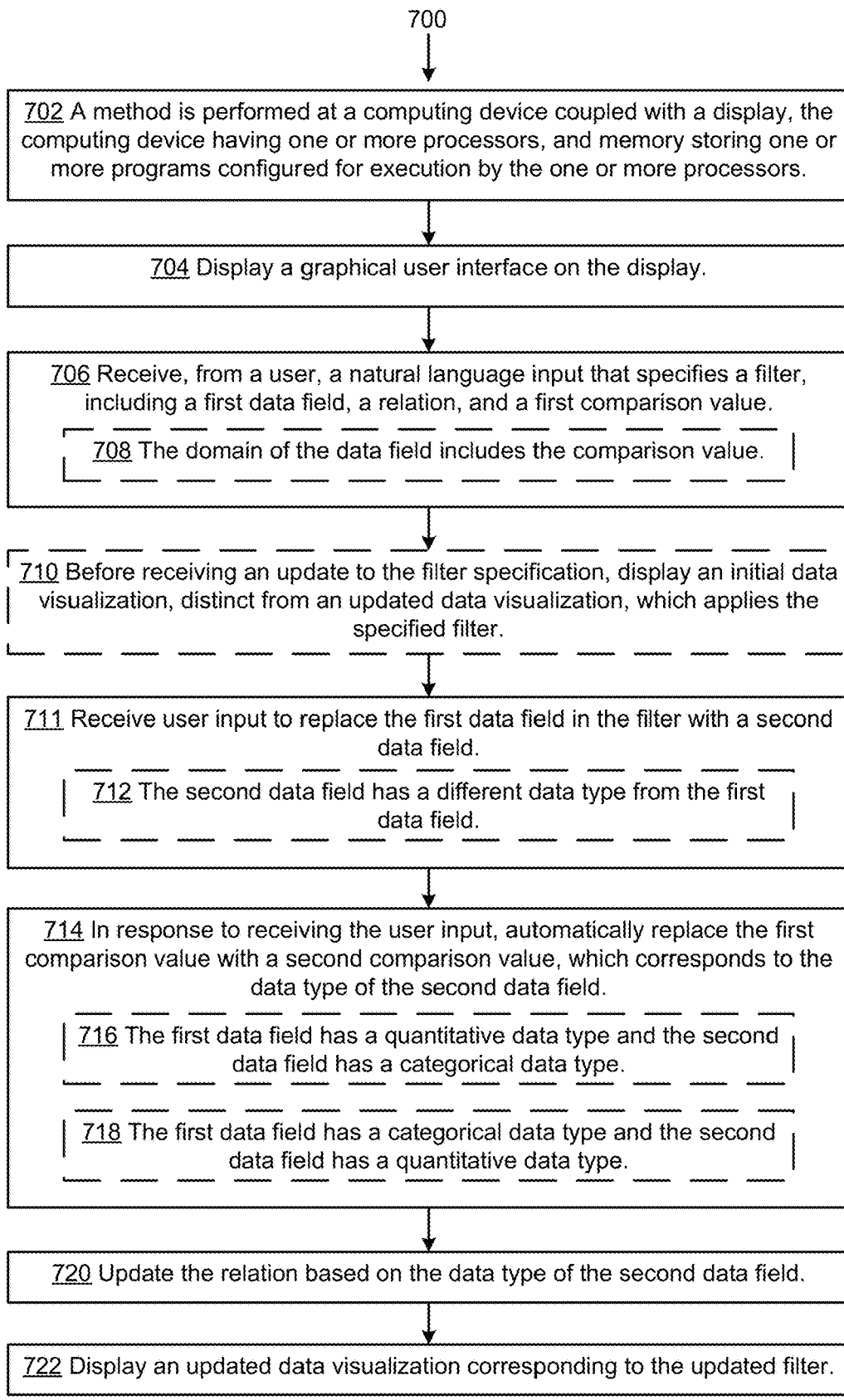
FIG. 7 provides a flowchart of a process for updating data filters according to some implementations.

FIG. 7 shows a method 700 of updating filter conditions in natural language expressions in accordance with some implementations. The method 700 is also called a process. In some implementations, the method is executed at and performed by a computing device (702) coupled with a display. The computing device has (702) one or more processors and memory. The memory stores one or more programs configured for execution by the one or more processors. The method 700, as performed by a computing device, is optionally governed by instructions that are stored in a non-transitory computer readable storage medium. The instructions are executed by one or more processors of the computing device. Each of the operations shown in FIG. 7 may correspond to instructions stored in computer memory or a non-transitory computer readable storage medium (e.g., the memory 214 of a computing device 200). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 700 may be combined and/or the order of some operations may be changed.

In some implementations, the computing device displays (704) a graphical user interface on the display. For example, the computing device displays graphical user interface 100 illustrated in FIG. 1.

The computing device receives (706), from a user, a natural language input that specifies a filter, including a first data field, a relation, and a first comparison value. In some implementations, the natural language input is received in a user interface control 120 in the graphical user interface 100. In at least implementations, at least a portion of the natural language input is typed by a user. In some implementations, at least a portion of the natural language input is selected, by the user, from a plurality of options provided by the computing device. In some implementations, only a portion of the natural language input is received from the user and the natural language input is automatically completed by the computing device (e.g., the computing device predicts and/or suggests how to complete the natural language input). For example, the user may input the first data field and the computing device automatically generates (e.g., populates) the comparison value based on the first field. For example, the natural language input shown in FIG. 5A includes a third phrase 502-3 "with Country in Argentina." The first data field corresponds to "Country" and the comparison value is "Argentina." As explained with reference to FIG. 5A, in some implementations, the natural language input matches a natural language template (e.g., to identify the type of filter that being used).

In this example, the domain of the first data field includes (708) the comparison value. For example, the domain of the first data field "Country" consists of country names, including "Argentina."

In some implementations, before receiving an update to the filter specification, the computing device displays (710) an initial data visualization, distinct from an updated data visualization, which applies the specified filter. For example, FIG. 5A shows a map data visualization (e.g., partially hidden behind the widget).

The computing device receives (711) user input to replace the first data field in the filter with a second data field. In some instances, the second data field has (712) a different data type from the first data field. For example, as shown in FIG. 5B, the user replaces the first data field "Country" 514 with "Population" 534. In this example, the first data field "Country" has a categorical data type (e.g., it is a dimension), but the data field "Population" has a quantitative data type (e.g., it is a measure). Thus, switching from the first data field to the second data field entails changing the type of data from categorical data to quantitative data. It is to be understood that a user input could switch from quantitative data to categorical data as well. In some instances, the user input does not change the data type of data used by the filter. For example, FIGS. 5C and 5D illustrate the user switching from the data field "Country" to the data field "Continent," both of which have categorical data. In some instances, in accordance with a determination that the switch does not change the type of data, the comparison value is not updated (e.g., the comparison value 556 remains "South" in FIGS. 5C and 5D). In some instances, when the switch to the data field does not change the type of data, the comparison value is updated to a term that is included in the domain of the second data field. For example, if the data field is switched from "Country" to "Continent," and the initial comparison value was "Argentina" (e.g., a value that is not included in the domain of "Continent") then the updated comparison value is changed to "South America."

In response to receiving the update to the first field, the computing device automatically replaces (714) the first comparison value with the second comparison value. For example, in response to the user input switching from the first data field "Country" to the second data field "Population" in FIGS. 5A and 5B, the computing device automatically updates the relation from "in" to "at least" 536 and changes "Argentina" to 10,000. Thus, the computing device updates the relation and the comparison value to match the second data field. For example, a user does not manually update the second field corresponding to the filter after changing the first field. This provides for an intuitive method of generating data visualizations that does not require a user to understand the differences between categorical and quantitative filters. Instead, the computing device determines which filter (e.g., quantitative or qualitative) should be applied based on the user's selection of the data field. Thus, if a user switches the data field to be a different data type, the computing device automatically updates the corresponding comparison value to prevent raising an error. In some instances, the first data field has (716) a quantitative data type and the second data field has (716) a categorical data type. In some instances, the first data field has (718) a categorical data type and the second data field has (718) a quantitative data type. For example, FIG. 5B illustrates the user switching from a first data field having a categorical data type (e.g., "Country") to a second data field having a quantitative data type (e.g., "Population").

In some instances, switching from the first data field to the second data field also entails changing (720) the relation used by the filter. For example, "contains" is a meaningful relation for a categorical data field, but is not a meaningful relation for a quantitative data field.

In some implementations, the computing device identifies a default value for the comparison value. For example, the computing device selects 10,000 as the default value based on the fact that this number will be compared to average populations. In some implementations, the computing device selects the default value based on information stored in the database and/or the data sources (e.g., using a sampling of data values for the data field). In some implementations, the user updates the default value. In some implementations, the user manually modifies the value in the natural language expression (e.g., changes the filter) after the computing device provides the default value.

The computing device displays (722) an updated data visualization corresponding to the updated filter. For example, FIG. 5B illustrates a bar chart data visualization (e.g., partially hidden behind the widget) that filters the data according to the data field "Population" and the comparison value 10,000. As shown in FIGS. 5A and 5B, the initial data visualization of FIG. 5A is different from the updated data visualization of FIG. 5B.

FIGS. 8A-8J illustrate widgets used in a natural language interface in accordance with some implementations. For example, the widget generation module 234 dynamically generates widgets to be displayed to the user in graphical user interface 100. The widgets are generated based in part on the natural language input received from the user. The computing device identifies an appropriate widget type based on the selection portion of the natural language input. Thus, the computing device maps a portion of the natural language input to an analytical concept to produce a widget that corresponds to the analytical concept. By dynamically generating the widget based on the natural language input, the user is provided with options to change the data visualization that make sense given the input.

Figure 8A:
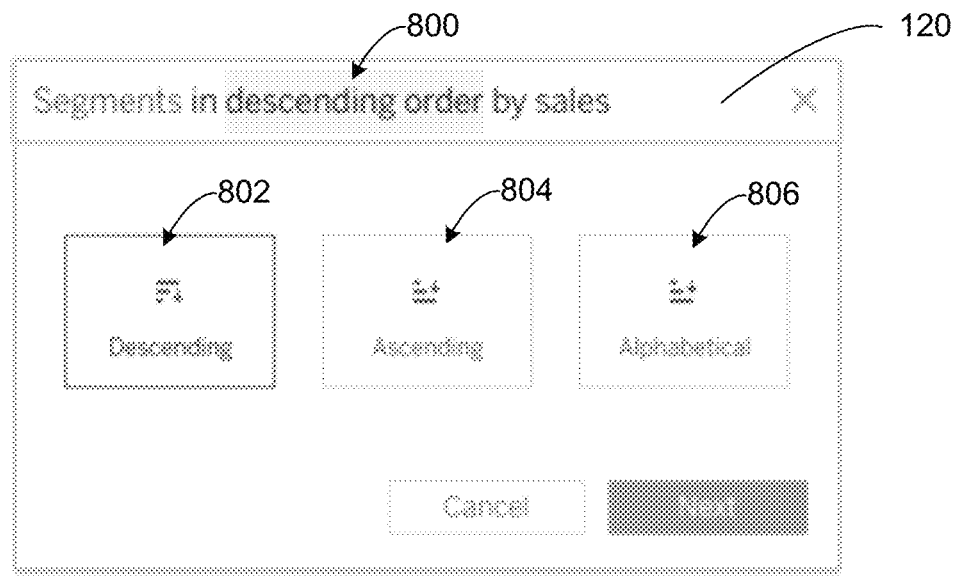

For example, FIG. 8A illustrates receiving a natural language input in control 120 that recites "Segments in descending order by sales." The computing device analyzes (e.g., parses) the natural language input and identifies that "descending order" 800 corresponds to an analytical concept of sorting the data (e.g., "Segments"). Thus, the computing device generates a widget that provides the user with a plurality of sort options, including a "descending" option 802, an "ascending" option 804, and an "alphabetical" option 806. In this example, the descending option 802 is selected. Thus, the segments will be sorted in a descending order by sales, as indicated by the natural language input.

Figure 8B:

FIG. 8B illustrates another example of generating a widget. The natural language phrase "top 20 Segments" is received by the computing device. The computing device determines that "top 20" 808 corresponds to an analytical concept of a limit. Thus, the computing device generates a widget that allows a user to input a limit, selecting between a top limit 810 and a bottom limit 812. Because the top limit 810 is selected, the user can enter how many top values in a quantity text box 813. Here, the natural language phase specifies a limit of the top 20. The widget provides a user-friendly way for a user to select and set limits and modify the natural language phrase.

Figure 8C:
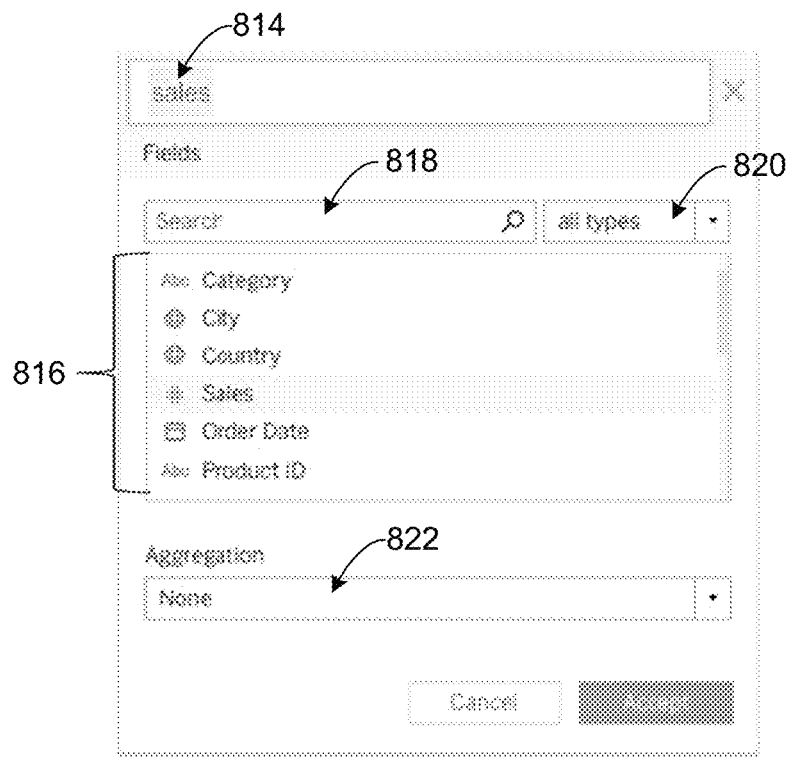
Figure 8D:
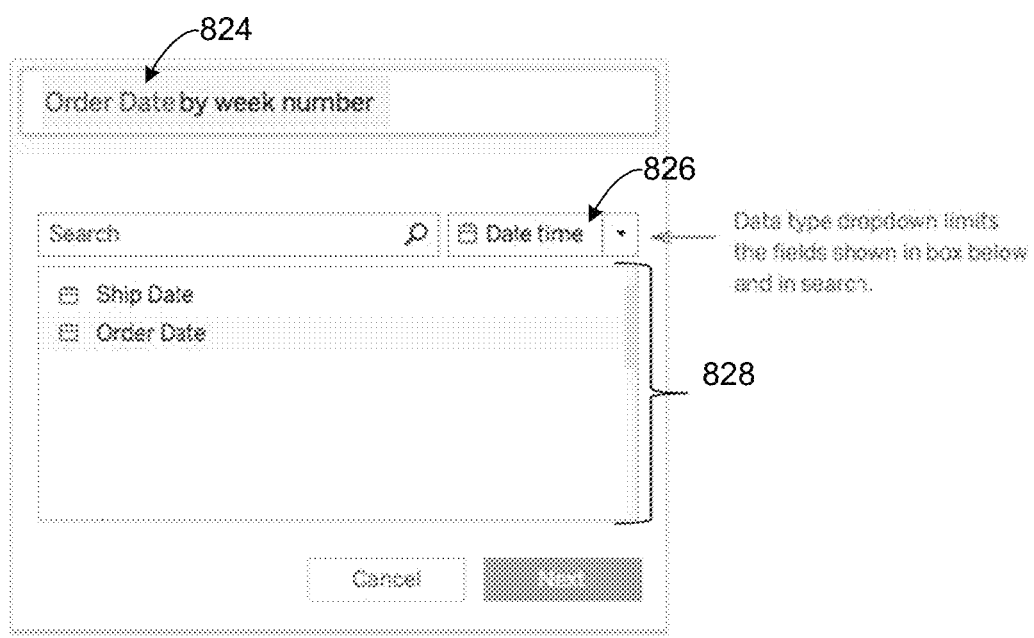

FIG. 8C illustrates an example of a fields list widget. For example, the natural language input merely includes the field "sales" 814. In some implementations, the field list widget comprises a scrollable widget that lists, in an area 816, all of the relevant fields, which is dependent on content. The widget includes a search box 818 that allows a user to filter the fields in the list and a data type dropdown 820 to filter the displayed fields according to data type. In some implementations, the widget includes an aggregation dropdown 822, which allows a user to select an aggregation type. For example, quantitative aggregations can specify sum, average, median, count, distinct count, minimum, maximum, or none (no aggregation). Date aggregations can specify year, quarter, quarter name, month, month name, day, day of month, week, week number, weekday, hour, hour of day, minute, minute of hour, second, second of minute, exact date, etc. For example, FIG. 8D illustrates that the "Order Date" field 824 can be filtered by "week number." The data type dropdown 826 limits the fields shown in the area 828 and in the search bar.

Figures 8E, 8F:
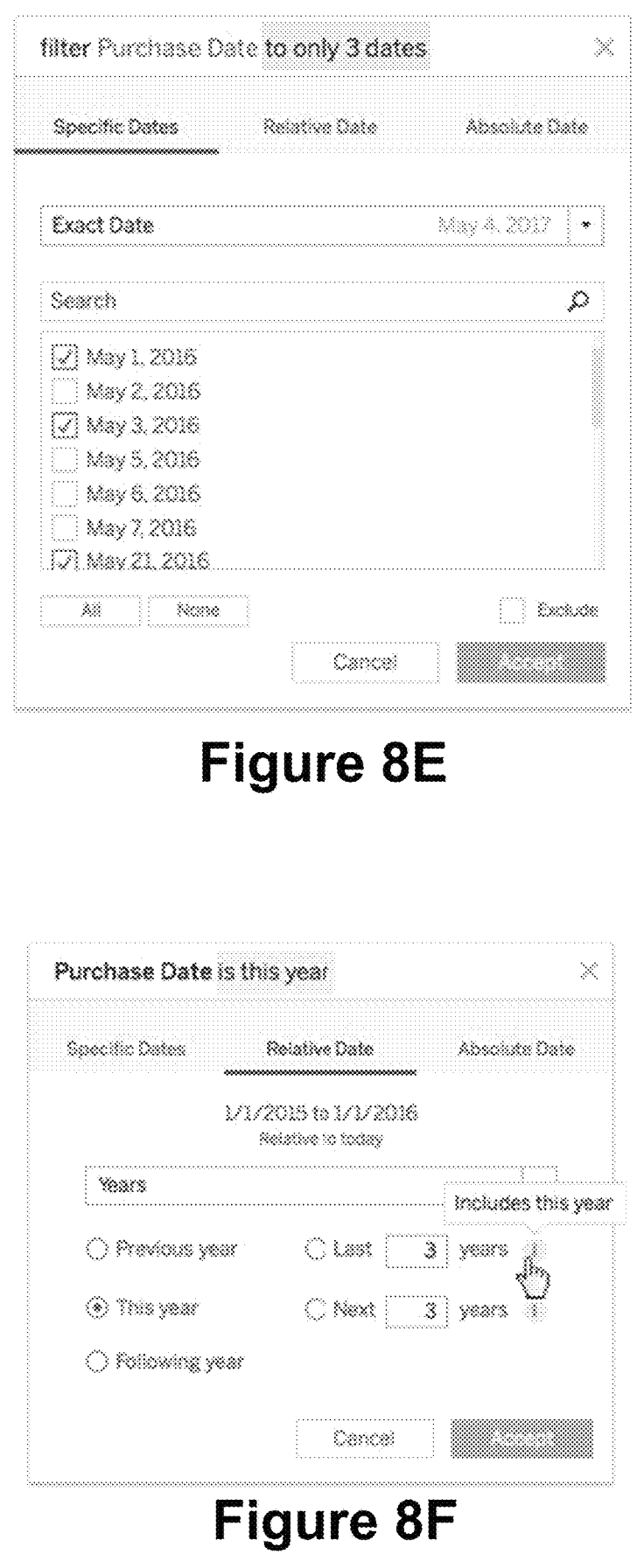
Figure 8G:
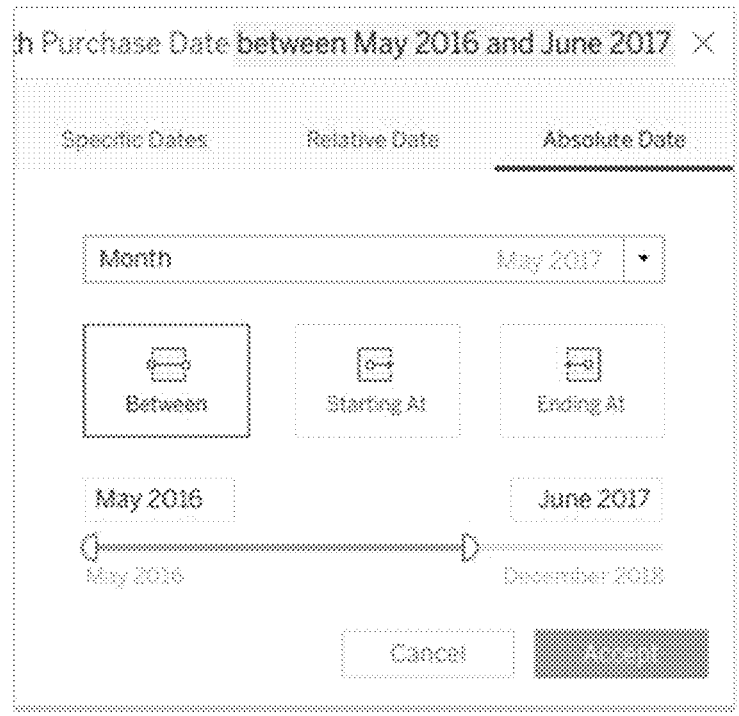

FIGS. 8E-8G are examples of date filter widgets. In some implementations, the widget includes three tabs at the top: specific values, relative date, and absolute date. The widgets shown in FIGS. 8E-8G are different interfaces of the widget that appear depending on which tab is selected. Each tab includes a dropdown to specify parameters relevant to the specific type of date filtering.

Figure 8H:
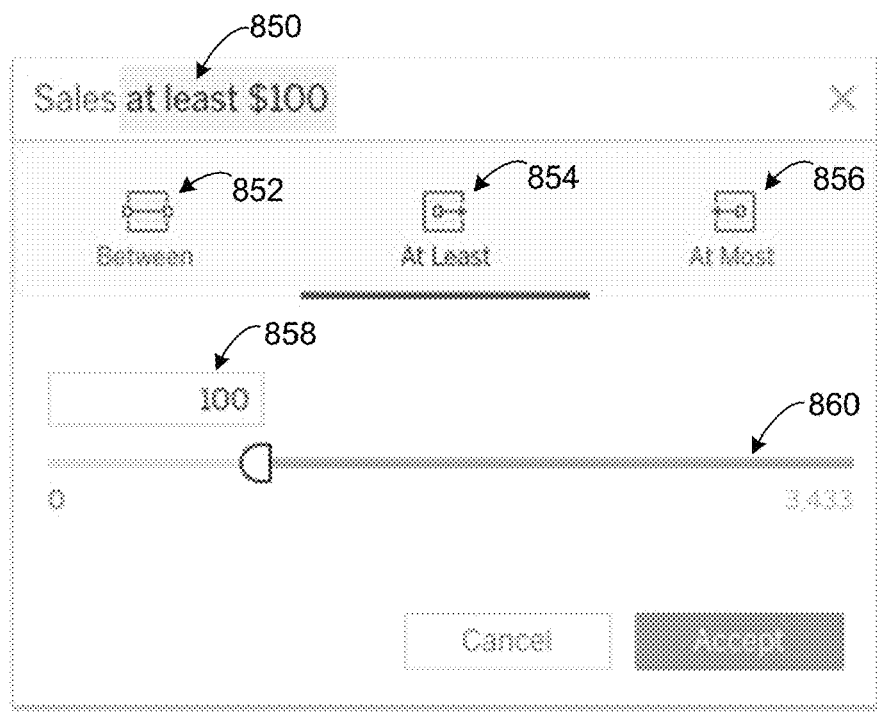

FIG. 8H shows an example of a quantitative filter. For example, the field "at least $100" is parsed by the computing device to correspond to a quantitative filter. In some implementations, the widget includes three options: "between" 852, "at least" 854, and "at most" 856. The widget also includes user interface elements such as a slider 860 (e.g., showing minimum and/or maximum values of the field) and an editable text input box 858.

Figure 8I:
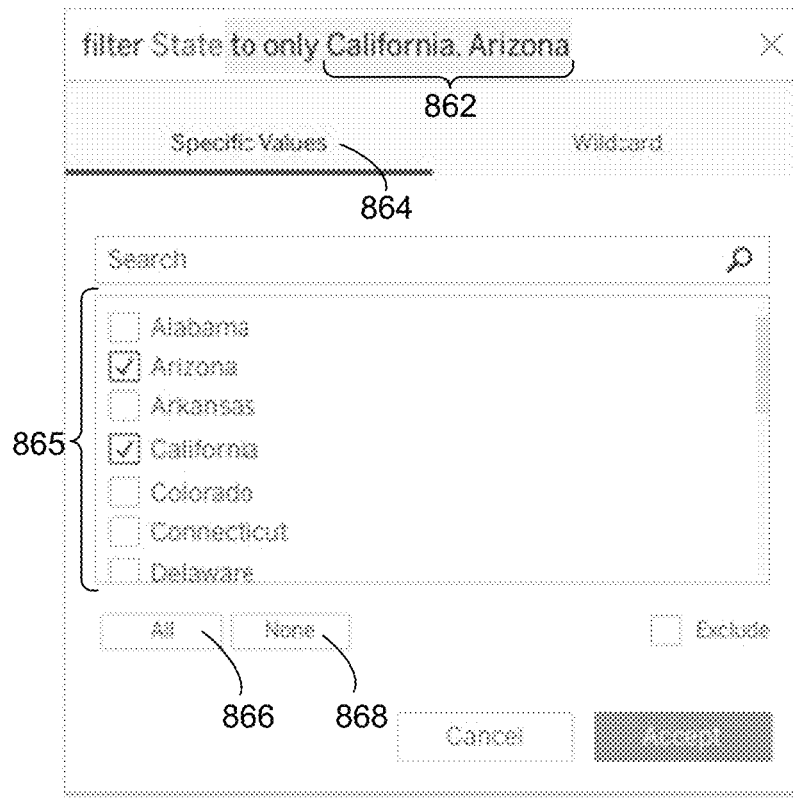
Figure 8J:
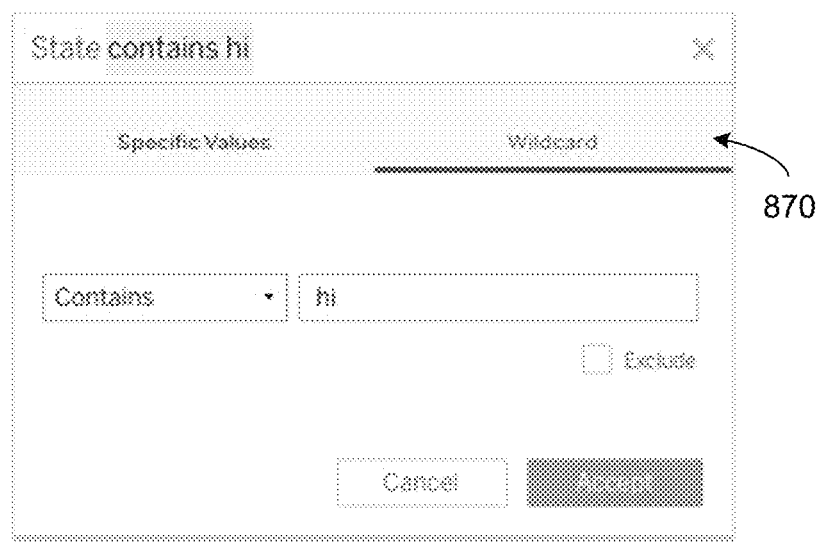

FIGS. 8I and 8J are examples of non-date categorical filters (e.g., based on the natural language input 862 that corresponds to a categorical filter). In some implementations, the widget has one or more tabs at the top (e.g., Specific Values 864 and Wildcard 870). This widget allows a user to easily select "All" 866 or "None" 868 of the data values displayed in the specific values list 865. In some implementations, in accordance with a determination that the categorical field is a date, the widget also includes options to switch to an Absolute Date Filter or a Relative Date Filter.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
    at a computing device coupled with a display, the computing device having one or more processors and memory storing one or more programs configured for execution by the one or more processors:
    displaying a graphical user interface on the display;
    receiving, from a user, a natural language input that specifies a filter, including a first data field, a relation, and a first comparison value;
    displaying the natural language input in an input box in the graphical user interface;
    receiving, from the user, a user input, in the input box, to replace the first data field in the filter with a second data field;
    in response to receiving the user input, automatically replacing, within the input box, the first comparison value with a second comparison value, wherein:
        the second comparison value corresponds to a data type of the second data field;
        the second comparison value is included in a domain of the second data field; and
        the second comparison value is selected based on a sampling of data values for the second data field; and
    displaying, on the graphical user interface, an updated data visualization according to the updated filter.

2. The method of claim 1, further comprising in response to receiving the user input, updating the relation based on the data type of the second data field.

3. The method of claim 1, wherein a domain of the first data field includes the first comparison value.

4. The method of claim 1, wherein the data type of the second data field is different from a data type of the first data field.

5. The method of claim 4, wherein the first data field has a quantitative data type and the second data field has a categorical data type.

6. The method of claim 4, wherein the first data field has a categorical data type and the second data field has a quantitative data type.

7. The method of claim 4, wherein the first data field has a measure data type and the second data field has a dimension data type.

8. The method of claim 4, wherein the first data field has a dimension data type and the second data field has a measure data type.

9. The method of claim 1, further comprising, before receiving the update to the filter specification, displaying, on the graphical user interface, an initial data visualization, distinct from the updated data visualization, which applies the specified filter.

10. A computing device, coupled with a display, comprising:
    one or more processors;
    memory storing one or more programs configured for execution by the one or more processors, the one or more programs including instructions for:
    displaying a graphical user interface on the display;
    receiving, from a user, a natural language input that specifies a filter, including a first data field, a relation, and a first comparison value;
    displaying the natural language input in an input box in the graphical user interface;

receiving, from the user, a user input, in the input box, to replace the first data field in the filter with a second data field;

in response to receiving the user input, automatically replacing, within the input box, the first comparison value with a second comparison value, wherein:

the second comparison value corresponds to a data type of the second data field;

the second comparison value is included in a domain of the second data field; and the second comparison value is selected based on a sampling of data values for the second data field; and displaying, on the graphical user interface, an updated data visualization according to the updated filter.

11. The computing device of claim 10, further comprising in response to receiving the user input, updating the relation based on the data type of the second data field.

12. The computing device of claim 10, wherein a domain of the first data field includes the first comparison value.

13. The computing device of claim 10, wherein the data type of the second data field is different from a data type of the first data field.

14. The computing device of claim 13, wherein the first data field has a quantitative data type and the second data field has a categorical data type.

15. The computing device of claim 13, wherein the first data field has a categorical data type and the second data field has a quantitative data type.

16. The computing device of claim 10, further comprising, before receiving the update to the filter specification, displaying, on the graphical user interface, an initial data visualization, distinct from the updated data visualization, which applies the specified filter.

17. A non-transitory computer-readable storage medium storing one or more programs configured for execution by the one or more processors, the one or more programs including instructions for:

displaying a graphical user interface on the display;

receiving, from a user, a natural language input that specifies a filter, including a first data field, a relation, and a first comparison value;

displaying the natural language input in an input box in the graphical user interface;

receiving, from the user, a user input, in the input box, to replace the first data field in the filter with a second data field;

in response to receiving the user input, automatically replacing, within the input box, the first comparison value with a second comparison value, wherein:

the second comparison value corresponds to a data type of the second data field;

the second comparison value is included in a domain of the second data field; and the second comparison value is selected based on a sampling of data values for the second data field; and displaying, on the graphical user interface, an updated data visualization according to the updated filter.

18. The computer-readable storage medium of claim 17, wherein a domain of the first data field includes the first comparison value.

* * * * *